US012732813B2

(12) United States Patent
He et al.

(10) Patent No.: US 12,732,813 B2
(45) Date of Patent: Sep. 8, 2026

(54) CONNECTION ESTABLISHMENT OF COMMUNICATION CONNECTION BETWEEN TWO NODES IN A CONVERGED COMMUNICATION SYSTEM

(71) Applicant: HUAWEI TECHNOLOGIES CO., LTD., Shenzhen (CN)

(72) Inventors: Qingchun He, Shenzhen (CN); Mingchao Li, Beijing (CN); Yong Wang, Shenzhen (CN); Xingqing Cheng, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 169 days.

(21) Appl. No.: 18/592,062

(22) Filed: Feb. 29, 2024

(65) Prior Publication Data

US 2024/0205674 A1 Jun. 20, 2024

Related U.S. Application Data

(63) Continuation of application No. PCT/CN2022/114680, filed on Aug. 25, 2022.

(30) Foreign Application Priority Data

Aug. 30, 2021 (CN) ........................ 202111005514.2

(51) Int. Cl.
*G06F 7/04* (2006.01)
*H04W 12/0431* (2021.01)
(Continued)

(52) U.S. Cl.
CPC ..... *H04W 12/069* (2021.01); *H04W 12/0431* (2021.01); *H04W 76/10* (2018.02)

(58) Field of Classification Search
CPC ............... H04W 12/069; H04W 76/10; H04W 12/0431
(Continued)

(56) References Cited

U.S. PATENT DOCUMENTS

2017/0359719 A1 12/2017 Li et al.
2019/0223250 A1* 7/2019 Dao ..................... H04W 72/23
(Continued)

FOREIGN PATENT DOCUMENTS

CN 101400059 A 4/2009
CN 107580324 A * 1/2018 .......... H04W 12/041
(Continued)

OTHER PUBLICATIONS

"Summary of offline discussion on CB: #43_Email043-IAB_Traffic_at_Donor_and_Intermedlate_nodes," 3GPP TSG-RAN WG3#107-e, R3-201142, Nokia, total 48 pages, 3rd Generation Project, Valbonne, France (Feb. 24-Mar. 6. 2020).

*Primary Examiner* — Haresh N Patel
(74) *Attorney, Agent, or Firm* — Leydig, Voit & Mayer, Ltd.

(57) ABSTRACT

This application provides a communication method, apparatus, and system, and relates to the field of communication technologies. The method includes: obtaining a second key used for communication authentication with a second node, where the second key is different from a preconfigured first key; receiving, from the second node, a release request for a first communication connection, where the first key is used for communication authentication on the first communication connection; and sending a connection establishment request to the second node, where the connection establishment request is used to request to establish a connection based on the second key. The method provides a technical solution in which the first node and the second node release a connection after determining an updated key, and establish a connection by using the updated key, to implement an
(Continued)

authentication procedure in a multi-communication convergence scenario.

20 Claims, 16 Drawing Sheets

(51) Int. Cl.

| | |
|---|---|
| ***H04W 12/069*** | (2021.01) |
| ***H04W 76/10*** | (2018.01) |
| *G06F 12/14* | (2006.01) |

(58) Field of Classification Search
USPC .......................................................... 726/6
See application file for complete search history.

(56) References Cited

U.S. PATENT DOCUMENTS

| | | | | |
|---|---|---|---|---|
| 2020/0252847 | A1* | 8/2020 | Park | H04W 76/27 |
| 2021/0153009 | A1* | 5/2021 | Patil | H04W 12/037 |
| 2021/0195563 | A1 | 6/2021 | Lee et al. | |

FOREIGN PATENT DOCUMENTS

| | | | | | |
|---|---|---|---|---|---|
| CN | 109548010 | A | * | 3/2019 | H04W 76/11 |
| CN | 110784434 | B | * | 11/2021 | H04L 63/08 |
| EP | 3793317 | A1 | | 3/2021 | |
| JP | 2009542091 | A | | 11/2009 | |
| JP | 2010004379 | A | | 1/2010 | |
| WO | WO-2020174291 | A1 | * | 9/2020 | H04W 12/03 |
| WO | WO-2021030576 | A1 | * | 2/2021 | H04W 36/0038 |
| WO | WO-2021037262 | A1 | * | 3/2021 | H04L 9/3247 |

* cited by examiner

CONNECTION ESTABLISHMENT OF COMMUNICATION CONNECTION BETWEEN TWO NODES IN A CONVERGED COMMUNICATION SYSTEM

CROSS-REFERENCE TO RELATED APPLICATIONS

This application is a continuation of International Application No. PCT/CN2022/114680, filed on Aug. 25, 2022, which claims priority to Chinese Patent Application No. 202111005514.2, filed on Aug. 30, 2021. The disclosures of the aforementioned applications are hereby incorporated by reference in their entireties.

TECHNICAL FIELD

Embodiments of this application relate to the field of communication technologies, and in particular, to a communication method, apparatus, and system.

BACKGROUND

Rapid development of mobile communication promotes continuous emergence of a plurality of application scenarios, and communication systems based on different communication technologies inevitably converge. For example, with mature development of 5G technologies and wide application of wireless short-range communication systems, a scenario in which wireless short-range communication and a 5G cellular network are converged has become a new trend. At the same time, a new convergence scenario also imposes a higher requirement on communication transmission security.

However, in a conventional standard, there is no secure and effective communication method for a convergence scenario of different communication systems.

SUMMARY

Embodiments of this application provide a communication method, apparatus, and system, to update a communication authentication key, and improve communication security.

According to a first aspect, an embodiment of this application provides a communication method, and the communication method may be applied to a first node. The method includes:

- obtaining a second key used for communication authentication with a second node, where the second key is different from a preconfigured first key; receiving, from the second node, a release request for a first communication connection, where the first key is used for communication authentication on the first communication connection; and sending a connection establishment request to the second node, where the connection establishment request is used to request to establish a connection based on the second key.

According to the foregoing method, embodiments of this application provide a technical solution in which the first node and the second node release a connection after determining an updated key, and establish a connection by using the new key. This implements switching between different communication connections and implements an update process of a key used for communication authentication, and effectively improves communication security.

In a possible implementation, that the connection establishment request is used to request to establish a connection based on the second key includes: The connection establishment request is used to request to perform an authentication and security context negotiation procedure based on the second key.

In a possible implementation, the method further includes: receiving authentication information that is based on the second key and that is from the second node, where the authentication information is used to verify an identity of the second node.

In a possible implementation, that the authentication information is used to verify an identity of the second node includes that the authentication information is used to verify whether a second communication connection to the second node is established based on the second key.

In a possible implementation, the first key is a key derived (or negotiated) based on a first communication system, and/or the second key is a key derived (or negotiated) based on a second communication system, and the first communication system is different from the second communication system.

In a possible implementation, the first communication system may be a single communication system, and the second communication system may be a communication system obtained after convergence of different communication systems.

According to the foregoing method, embodiments of this application provide a communication method in a scenario in which different communication systems perform converged communication. This effectively improves communication security.

In a possible implementation, an authentication response that is based on the second key is sent to the second node, where the authentication response is used to verify an identity of the first node.

In a possible implementation, that the authentication response is used to verify an identity of the first node includes: The authentication response is used by the second node to verify whether to establish the second communication connection to the first node based on the second key.

According to the foregoing method, the first node sends the authentication response to the second node, so that the second node can further determine, based on the authentication response, whether authentication based on the second key succeeds.

In a possible implementation, the release request includes request cause information, and the request cause information indicates that a key used for communication authentication is updated.

According to the foregoing method, the release request carries a request cause, so that after receiving the release request from the second node, the first node can learn the request cause, so that the first node responds to the request more pertinently, and adaptability is stronger.

In a possible implementation, the second key is valid within first duration, and the first duration is defined by using a timer or a timestamp.

According to the foregoing method, in a process in which the first node and the second node perform communication transmission by using the second key, whether the second key is valid is further verified. This can ensure time validity of the second key, and can better ensure security of communication transmission.

In a possible implementation, the second key is valid within the first duration starting from a first moment, and the first moment is a moment at which the first communication connection is released or a moment at which the connection establishment request is sent.

According to the foregoing method, this application provides a plurality of cases of the first moment. Therefore, a plurality of solutions for determining validity of the second key are provided, and flexibility is higher.

In a possible implementation, the method further includes: performing, within a validity period of the second key, information transmission with a third node by using a backhaul link between the second node and the third node.

According to a second aspect, an embodiment of this application provides a communication method, and the communication method may be applied to a second node. The method includes:

obtaining a second key used for communication authentication with a first node, where the second key is different from a preconfigured first key; sending a release request for a first communication connection to the first node, where the first key is used for communication authentication on the first communication connection; and receiving a connection establishment request sent by the first node, where the connection establishment request is used to request to establish a connection based on the second key.

According to the foregoing method, embodiments of this application provide a technical solution in which the first node and the second node release a connection after determining an updated key, and establish a connection by using the new key. This implements switching between different communication connections and implements an update process of a key used for communication authentication, and effectively improves communication security.

In a possible implementation, that the connection establishment request is used to request to establish a connection based on the second key includes: The connection establishment request is used to request to perform an authentication and security context negotiation procedure based on the second key.

In a possible implementation, the method further includes: sending authentication information that is based on the second key to the first node, where the authentication information is used to verify an identity of a second node.

In a possible implementation, that the authentication information is used to verify an identity of a second node includes that the authentication information is used by the first node to verify whether a second communication connection to the second node is established based on the second key.

In a possible implementation, the first key is a key derived (or negotiated) based on a first communication system, and/or the second key is a key derived (or negotiated) based on a second communication system, and the first communication system is different from the second communication system.

In a possible implementation, the first communication system may be a single communication system, and the second communication system may be a communication system obtained after convergence of different communication systems.

According to the foregoing method, embodiments of this application provide a communication method in a scenario in which different communication systems perform converged communication. This effectively improves communication security.

In a possible implementation, the method further includes: receiving an authentication response that is based on the second key and that is from the first node, where the authentication response is used to verify an identity of the first node.

In a possible implementation, that the authentication response is used to verify an identity of the first node includes: The authentication response is used by the second node to verify whether to establish the second communication connection to the first node based on the second key. According to the foregoing method, the first node sends the authentication response to the second node, so that the second node can further determine, based on the authentication response, whether authentication based on the second key succeeds.

In a possible implementation, the release request includes request cause information, and the request cause information indicates that a key used for communication authentication is updated.

According to the foregoing method, the release request carries a request cause, so that after receiving the release request from the second node, the first node can learn the request cause, so that the first node responds to the request more pertinently, and adaptability is stronger.

In a possible implementation, the second key is valid within first duration, and the first duration may be defined by using a timer or a timestamp.

According to the foregoing method, in a process in which the first node and the second node perform communication transmission by using the second key, whether the second key is valid is further verified. This can ensure time validity of the second key, and can better ensure security of communication transmission.

In a possible implementation, the second key is valid within the first duration starting from a first moment, and the first moment is a moment at which the first communication connection is released, or a moment at which the second node receives the connection establishment request.

According to the foregoing method, this application provides a plurality of cases of the first moment. Therefore, a plurality of solutions for determining validity of the second key are provided, and flexibility is higher.

In a possible implementation, the method further includes: sending, within a validity period of the second key, transmission information from the first node to a third node by using a backhaul link between the second node and the third node.

In a possible implementation, the backhaul link is suspended after the first communication connection to the first node is released.

According to the foregoing method, after releasing the first communication connection, the second node suspends the backhaul link. This can effectively reduce system overheads, and can save resources.

In a possible implementation, the method further includes: activating the backhaul link after determining that a second communication connection to the first node is successfully established, where communication authentication is performed on the second communication connection based on the second key.

According to the foregoing method, after it is determined that the second communication connection to the first node is successfully established, the previously suspended backhaul link is activated, to continue to use the backhaul link for communication transmission. This can effectively reduce system overheads, and can save resources.

According to a third aspect, an embodiment of this application provides a communication method, and the communication method may be applied to a first node. The method includes:

obtaining a second key used for communication authentication with a second node, where the second key is different from a preconfigured first key; releasing a first communication connection to the second node, where the first key is used for communication authentication on the first communication connection; and sending a connection establishment request to the second node, where the connection establishment request is used to request to establish a connection based on the second key.

According to the foregoing method, embodiments of this application provide a technical solution in which the first node and the second node release a connection after determining an updated key, and establish a connection by using the new key. This implements switching between different communication connections and implements an update process of a key used for communication authentication, and effectively improves communication security.

In a possible implementation, that the connection establishment request is used to request to establish a connection based on the second key includes: The connection establishment request is used to request to perform an authentication and security context negotiation procedure based on the second key.

In a possible implementation, the method further includes: receiving authentication information that is based on the second key and that is from the second node, where the authentication information is used to verify an identity of the second node.

In a possible implementation, that the authentication information is used to verify an identity of the second node includes that the authentication information is used to verify whether a second communication connection to the second node is established based on the second key.

In a possible implementation, the first key is a key derived (or negotiated) based on a first communication system, and/or the second key is a key derived (or negotiated) based on a second communication system, and the first communication system is different from the second communication system.

In a possible implementation, the first communication system may be a single communication system, and the second communication system may be a communication system obtained after convergence of different communication systems.

According to the foregoing method, embodiments of this application provide a communication method in a scenario in which different communication systems perform converged communication. This effectively improves communication security.

In a possible implementation, the method further includes: sending an authentication response that is based on the second key to the second node, where the authentication response is used to verify an identity of the first node.

In a possible implementation, that the authentication response is used to verify an identity of the first node includes: The authentication response is used by the second node to verify whether to establish the second communication connection to the first node based on the second key.

According to the foregoing method, the first node sends the authentication response to the second node, so that the second node can further determine, based on the authentication response, whether authentication based on the second key succeeds.

In a possible implementation, the release request includes request cause information, and the request cause information indicates that a key used for communication authentication is updated.

According to the foregoing method, the release request carries a request cause, so that after receiving the release request from the second node, the first node can learn the request cause, so that the first node responds to the request more pertinently, and adaptability is stronger.

In a possible implementation, the second key is valid within first duration, and the first duration is defined by using a timer or a timestamp.

According to the foregoing method, in a process in which the first node and the second node perform communication transmission by using the second key, whether the second key is valid is further verified. This can ensure time validity of the second key, and can better ensure security of communication transmission.

In a possible implementation, the second key is valid within the first duration starting from a first moment, and the first moment is a moment at which the first communication connection is released or a moment at which the connection establishment request is sent.

According to the foregoing method, this application provides a plurality of cases of the first moment. Therefore, a plurality of solutions for determining validity of the second key are provided, and flexibility is higher.

In a possible implementation, the method further includes: performing, within a validity period of the second key, information transmission with a third node by using a backhaul link between the second node and the third node.

According to a fourth aspect, an embodiment of this application provides a communication method, and the communication method may be applied to a second node. The method includes:

obtaining a second key used for communication authentication with a first node, where the second key is different from a preconfigured first key; releasing a first communication connection to the first node, where the first key is used for communication authentication on the first communication connection; and receiving a connection establishment request sent by the first node, where the connection establishment request is used to request to establish a connection based on the second key.

According to the foregoing method, embodiments of this application provide a technical solution in which the first node and the second node release a connection after determining an updated key, and establish a connection by using the new key. This implements switching between different communication connections and implements an update process of a key used for communication authentication, and effectively improves communication security.

In a possible implementation, that the connection establishment request is used to request to establish a connection based on the second key includes: The connection establishment request is used to request to perform an authentication and security context negotiation procedure based on the second key.

In a possible implementation, the method further includes: sending authentication information that is based on the second key to the first node, where the authentication information is used to verify an identity of the second node.

In a possible implementation, that the authentication information is used to verify an identity of the second node includes that the authentication information is used by the first node to verify whether a second communication connection to the second node is established based on the second key.

In a possible implementation, the first key is a key derived (or negotiated) based on a first communication system, and/or the second key is a key derived (or negotiated) based on a second communication system, and the first communication system is different from the second communication system.

In a possible implementation, the first communication system may be a single communication system, and the second communication system may be a communication system obtained after convergence of different communication systems.

According to the foregoing method, embodiments of this application provide a communication method in a scenario in which different communication systems perform converged communication. This effectively improves communication security.

In a possible implementation, the method further includes: receiving an authentication response fed back by the first node, where the authentication response is used to verify an identity of the first node.

In a possible implementation, that the authentication response is used to verify an identity of the first node includes: The authentication response is used by the second node to verify whether to establish the second communication connection to the first node based on the second key.

According to the foregoing method, the first node sends the authentication response to the second node, so that the second node can further determine, based on the authentication response, whether authentication based on the second key succeeds.

In a possible implementation, the release request includes request cause information, and the request cause information indicates that a key used for communication authentication is updated.

According to the foregoing method, the release request carries a request cause, so that after receiving the release request from the second node, the first node can learn the request cause, so that the first node responds to the request more pertinently, and adaptability is stronger.

In a possible implementation, the second key is valid within first duration, and the first duration may be defined by using a timer or a timestamp.

According to the foregoing method, in a process in which the first node and the second node perform communication transmission by using the second key, whether the second key is valid is further verified. This can ensure time validity of the second key, and can better ensure security of communication transmission.

In a possible implementation, the second key is valid within the first duration starting from a first moment, and the first moment is a moment at which the first communication connection is released, or a moment at which the second node receives the connection establishment request.

According to the foregoing method, this application provides a plurality of cases of the first moment. Therefore, a plurality of solutions for determining validity of the second key are provided, and flexibility is higher.

In a possible implementation, the method further includes: sending, within a validity period of the second key, transmission information from the first node to a third node by using a backhaul link between the second node and the third node.

In a possible implementation, the backhaul link is suspended after the first communication connection to the first node is released.

According to the foregoing method, after releasing the first communication connection, the second node suspends the backhaul link. This can effectively reduce system overheads, and can save resources.

In a possible implementation, the method further includes: activating the backhaul link after determining that the second communication connection to the first node is successfully established, where communication authentication is performed on the second communication connection based on the second key.

According to the foregoing method, after it is determined that the second communication connection to the first node is successfully established, the previously suspended backhaul link is activated, to continue to use the backhaul link for communication transmission. This can effectively reduce system overheads, and can save resources.

According to a fifth aspect, an embodiment of this application provides a communication apparatus. The apparatus is configured to implement the first aspect or any method of the first aspect, and includes corresponding function modules or units, which are separately configured to implement steps in the method in the first aspect. A function may be implemented by hardware, or may be implemented by hardware by executing corresponding software. The hardware or software includes one or more modules or units corresponding to the function. Alternatively, the apparatus is configured to implement the third aspect or any method of the third aspect, and includes corresponding function modules or units, which are separately configured to implement steps in the method in the third aspect. The function may be implemented by hardware, or may be implemented by hardware by executing corresponding software. The hardware or software includes one or more modules or units corresponding to the function.

According to a sixth aspect, an embodiment of this application provides a communication apparatus. The apparatus is configured to implement the second aspect or any method of the second aspect, and includes corresponding function modules or units, which are separately configured to implement steps in the method in the second aspect. A function may be implemented by hardware, or may be implemented by hardware by executing corresponding software. The hardware or software includes one or more modules or units corresponding to the function. Alternatively, the apparatus is configured to implement the fourth aspect or any method of the fourth aspect, and includes corresponding function modules or units, which are separately configured to implement steps in the method in the fourth aspect. The function may be implemented by hardware, or may be implemented by hardware by executing corresponding software. The hardware or software includes one or more modules or units corresponding to the function.

According to a seventh aspect, a communication apparatus is provided, where the apparatus includes a processor and a memory. The memory is configured to store a computing program or instructions, and the processor is coupled to the memory. When the processor executes the computer program or the instructions, the apparatus performs the first aspect or any method in the first aspect, or the apparatus performs the third aspect or any method in the third aspect.

The communication apparatus may be a first apparatus, or an apparatus that can support the first apparatus in implementing a function of the method provided in the first aspect, or an apparatus that can support the first apparatus in implementing a function of the method provided in the third aspect, for example, a chip system. For example, the communication apparatus may be a terminal device or some components (for example, a chip) in a terminal device. The terminal device may be, for example, an intelligent mobile terminal, a smart home device, a smart car, or an intelligent wearable device. The intelligent mobile terminal is, for example, a mobile phone, a tablet computer, a notebook computer, an ultra-mobile personal computer (UMPC), a netbook, or a personal digital assistant (PDA). The smart home device includes a smart refrigerator, a smart washing machine, a smart television (TV), a speaker, and the like. A wearable device of a smart car is, for example, a smart headset, smart glasses, smart clothes, or shoes.

According to an eighth aspect, a communication apparatus is provided, where the apparatus includes a processor and a memory. The memory is configured to store a computing program or instructions, and the processor is coupled to the memory. When the processor executes the computer program or the instructions, the apparatus performs the second aspect or any method in the second aspect, or the apparatus performs the fourth aspect or any method in the fourth aspect. The communication apparatus may be a second apparatus, or an apparatus that can support the second apparatus in implementing a function of the method provided in the second aspect, or an apparatus that can support the second apparatus in implementing a function of the method provided in the fourth aspect, for example, a chip system. For example, the communication apparatus may be a terminal device or some components (for example, a chip) in a terminal device. The terminal device may be, for example, an intelligent mobile terminal, a smart home device, a smart car, or an intelligent wearable device. The intelligent mobile terminal is, for example, a mobile phone, a tablet computer, a notebook computer, an ultra-mobile personal computer (UMPC), a netbook, or a personal digital assistant (PDA). The smart home device includes a smart refrigerator, a smart washing machine, a smart TV, a speaker, and the like. A wearable device of a smart car is, for example, a smart headset, smart glasses, smart clothes, or shoes.

According to a ninth aspect, a terminal is provided. The terminal may include the apparatus according to the fifth aspect or the seventh aspect and the apparatus according to the sixth aspect or the eighth aspect. Optionally, the apparatus may be a smart home device, an intelligent manufacturing device, an intelligent transportation device, or the like, for example, a vehicle, an unmanned aerial vehicle, an unmanned transport vehicle, an automobile and a vehicle, a robot, or the like. Alternatively, the apparatus may be a mouse, a keyboard, a wearable device, a TWS headset, or the like.

According to a tenth aspect, this application provides a chip, where the chip is connected to a memory, and is configured to read and execute a computer program or instructions stored in the memory, to implement the method in any one of the first aspect or the possible implementations of the first aspect; or implement the method in any one of the second aspect or the possible implementations of the second aspect; or implement the method in any one of the third aspect or the possible implementations of the third aspect; or implement the method in any one of the fourth aspect or the possible implementations of the fourth aspect.

According to an eleventh aspect, a computer-readable storage medium is provided. The computer-readable storage medium stores a computer program or instructions. When the computer program or the instructions are executed by an apparatus, the apparatus is enabled to perform the method in any one of the first aspect or the possible implementations of the first aspect, or the apparatus is enabled to perform the method in any one of the third aspect or the possible implementations of the third aspect.

According to a twelfth aspect, a computer-readable storage medium is provided. The computer-readable storage medium stores a computer program or instructions. When the computer program or the instructions are executed by an apparatus, the apparatus is enabled to perform the method in any one of the second aspect or the possible implementations of the second aspect, or the apparatus is enabled to perform the method in any one of the fourth aspect or the possible implementations of the fourth aspect.

According to a thirteenth aspect, a computer program product provided in this application is provided. The computer program product includes a computer program or instructions. When the computer program or the instructions are executed by an apparatus, the apparatus is enabled to perform the method in any one of the first aspect or the possible implementations of the first aspect, or the apparatus is enabled to perform the method in any one of the third aspect or the possible implementations of the third aspect.

According to a fourteenth aspect, a computer program product provided in this application is provided. The computer program product includes a computer program or instructions. When the computer program or the instructions are executed by an apparatus, the apparatus is enabled to perform the method in any one of the second aspect or the possible implementations of the second aspect, or the apparatus is enabled to perform the method in any one of the third aspect or the possible implementations of the third aspect.

It should be understood that, the technical solutions provided in this application may be applied to a convergence scenario of different communication systems, and a communication method in a scenario in which different communication systems perform converged communication is provided. This effectively improves communication security. In addition, validity of a key used for communication authentication is set, so that time validity of the key used for communication authentication can be ensured. This better ensures communication transmission security.

DESCRIPTION OF EMBODIMENTS

Embodiments of this application provide a communication method and apparatus, to implement an authentication procedure of convergence of wireless short-range and a 5G cellular network. The following describes embodiments of this application in detail with reference to accompanying drawings.

The communication method provided in embodiments of this application may be applied to a 5th generation (5G) communication system, for example, 5G new radio (NR), or may be applied to various future communication systems, for example, a 6th generation (6G) communication system. This is not limited herein.

Figures 1, 2:
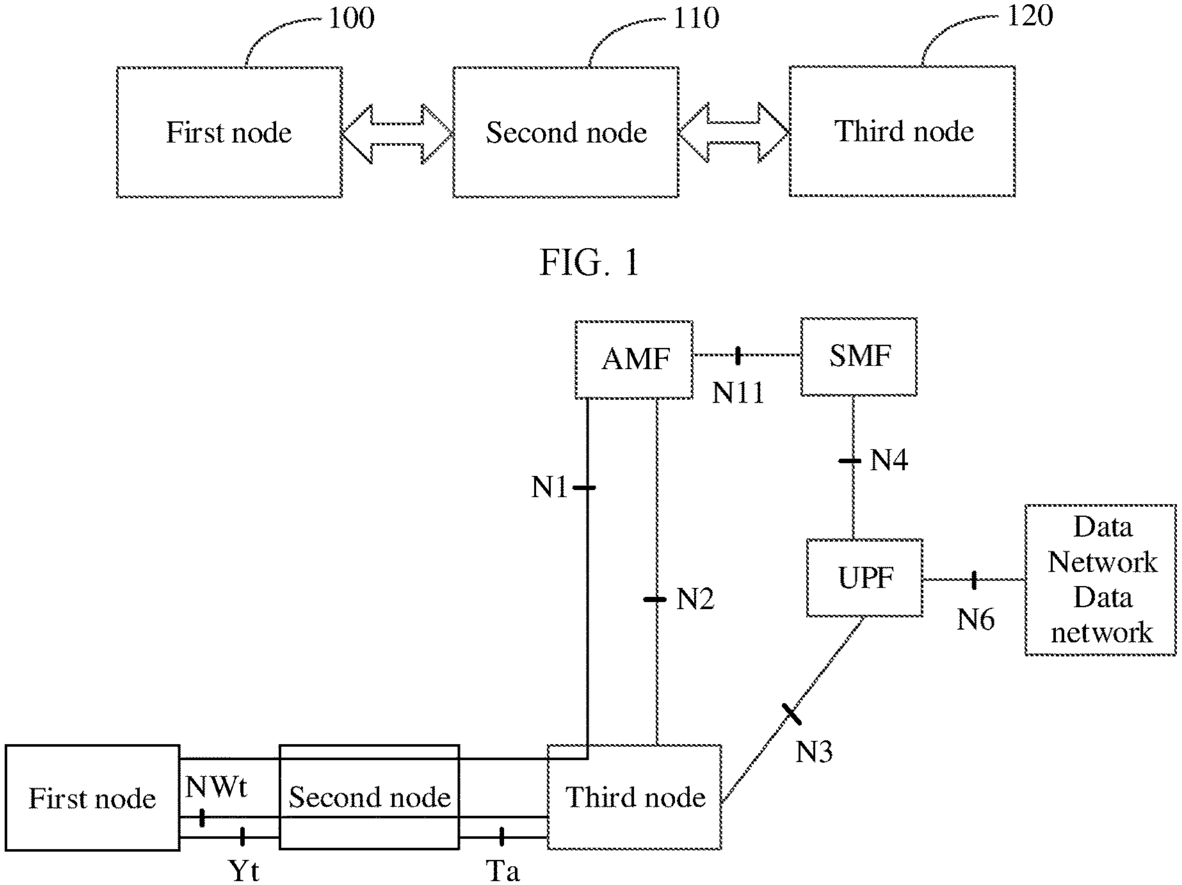
FIG. 1 is a schematic diagram of a first communication system according to an embodiment of this application.
FIG. 2 is a schematic diagram of a second communication system according to an embodiment of this application.

As shown in FIG. 1, an embodiment of this application provides an architecture of a communication system to which the communication method is applicable. The communication system may include a first node 100, a second node 110, and a third node 120. Optionally, in the communication system, the first node may be connected to the second node, and the second node may be connected to the third node.

The communication system in this application may be a communication system obtained after different communication systems are converged, for example, a communication system obtained after a wireless short-range communication system is converged with a 5G cellular network communication system. This is not limited herein. The converged communication system may also be referred to as a tight interworking communication system, or an interworking communication system.

For example, in this application, a communication system obtained after a wireless short-range communication system and a 5G cellular network communication system are converged is used as an example to describe the converged communication system.

In the converged communication system, a terminal node that supports wireless short-range communication may access a 5G network by using a control node or a gateway node, and further use a service provided by the 5G network. In addition, the 5G network may further configure and manage a data transmission policy for the terminal node based on subscription information and link status information of the terminal node, to provide a refined service for the terminal node. In other words, in the converged communication system, the wireless short-range communication system and the 5G cellular network communication system may interact with each other to work and complement each other.

Optionally, the wireless short-range communication system described in this application may be any possible short-range communication system, for example, a short-range communication system that may appear now and in the future, such as Bluetooth, Wi-Fi, a vehicle-mounted universal short-range communication system, and SparkLink.

The first node may be a terminal device or a communication apparatus that can support the terminal device in implementing a function of the method, or the first node may be a network device or a communication apparatus that can support the network device in implementing a function of the method, or certainly, may be another communication apparatus, for example, a chip system. The second node may be a network device or a communication apparatus that can support the network device in implementing a function of the method, or the second node may be a terminal device or a communication apparatus that can support the terminal device in implementing a function of the method, or certainly, may be another communication apparatus, for example, a chip system. The third node may be a network device or a communication apparatus that can support the network device in implementing a function of the method, or the third node may be a terminal device or a communication apparatus that can support the terminal device in implementing a function of the method, or certainly, may be another communication apparatus, for example, a chip system.

Optionally, the terminal device in embodiments of this application may be a device configured to implement a wireless communication function, for example, a terminal or a chip that may be used in the terminal. For example, the terminal device may include a handheld device with a wireless connection function, or a processing device connected to a wireless modem. The terminal device may communicate with a core network through a radio access network (RAN), and exchange a voice and/or data with the RAN. The terminal device may be referred to as user equipment (UE), a wireless terminal device, a mobile terminal device, a subscriber unit, a subscriber station, a mobile station, a mobile console (mobile), a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, or a smart wearable device. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

Optionally, the network device in this embodiment of this application may include an access network (AN) device, a radio access network (RAN) device, and an access network device such as a base station (for example, an access point). The wireless terminal device may refer to a device that communicates with a wireless terminal device over an air interface by using one or more cells in an access network. The base station may be configured to mutually convert a received over-the-air frame and an internet protocol (IP) packet, and serve as a router between the terminal device and a remaining part of the access network. The remaining part of the access network may include an IP network. The network side device may further coordinate attribute management of the air interface. For example, the network device may include an evolved NodeB (NodeB, eNB, or e-NodeB) in a long term evolution (LTE) system or a long term evolution-advanced (LTE-A) system; may include a next generation NodeB (gNB), a next generation evolved NodeB (ng-eNB), or an enhanced next generation NodeB en-gNB (gNB) in a 5th generation (5G) mobile communication technology new radio (NR) system; may include a centralized unit (CU) and a distributed unit (DU) in a cloud access network (Cloud RAN) system; or may further include a relay device. This is not limited in embodiments of this application.

In addition, this application further provides another communication system. As shown in FIG. 2, the communication system may further include function entities such as a session management function (SMF), an access and mobility management function (AMF), a user plane function (UPF), and a DN.

Functions may be connected through an interface. A sequence number of the interface or a name of the interface is not limited in embodiments of this application. An interface defined in a 3GPP-related standard protocol of a 5G system may be used, or an interface in a future communication system may be used. For example, the terminal device communicates with the AMF through an interface of a next generation network (next generation, N) 1 (N1), the network device communicates with the AMF through an N2 interface (N2), and the network device communicates with the local UPF through an N3 interface (N3). The UPF communicates with the DN through an N6 interface (N6). The AMF communicates with the SMF through an N11 interface (N11), and the SMF communicates with the UPF through an N4 interface (N4).

The functions included in the communication system may also be referred to as a function entity, a network element, or another name. For example, the SMF may be referred to as an SMF entity. Optionally, functions in embodiments of this application may be implemented by one device, or may be jointly implemented by a plurality of devices, or may be implemented by one or more function modules in one device. This is not specifically limited in embodiments of this application. It may be understood that each function in embodiments of this application may be a network element in a hardware device, may be a software function running on dedicated hardware, a combination of hardware and software, or a virtualization function instantiated on a platform (for example, a cloud platform).

It should be noted that a distribution form of each function is not limited in embodiments of this application. Optionally, each function may alternatively include another function entity formed after any plurality of functions are combined, for example, a function entity having two functions: session management and policy control, a function entity having three functions: session management, access and mobility management, and policy control, or a function entity having two functions: network exposure and an application function.

It should be noted that communications systems shown in FIG. 1 and FIG. 2 do not constitute a limitation on a communication system to which embodiments of this application are applicable. Certainly, a quantity of terminal devices in FIG. 2 is merely an example. During actual application, the network device may serve a plurality of terminal devices. The network device and all or some of the plurality of terminal devices each may determine a scheduling limitation according to methods provided in embodiments of this application. The communication system architecture shown in FIG. 1 and/or FIG. 2 may be a non-roaming 5G system architecture. Optionally, the method in embodiments of this application is further applicable to a roaming 5G system architecture and various future communication networks.

Each function or device in embodiments of this application may also be referred to as a communication apparatus, and may be a general-purpose device or a dedicated device. This is not specifically limited in embodiments of this application.

The foregoing describes an application architecture in embodiments of this application. The following describes technical features in embodiments of this application.

Currently, there is no secure and effective communication method for a convergence scenario of different communication systems. In view of this, embodiments of this application provide a technical solution in which a first node and a second node release a connection after determining an updated key, and establish a connection by using the new key, to provide a communication method in a scenario in which different communication systems perform converged communication. This effectively improves communication security. The method and the device are based on a same technical concept. Because problem resolving principles of the method and the device are similar, for implementation of the device and the method, refer to each other, and repeated parts are not described again.

Figure 3:
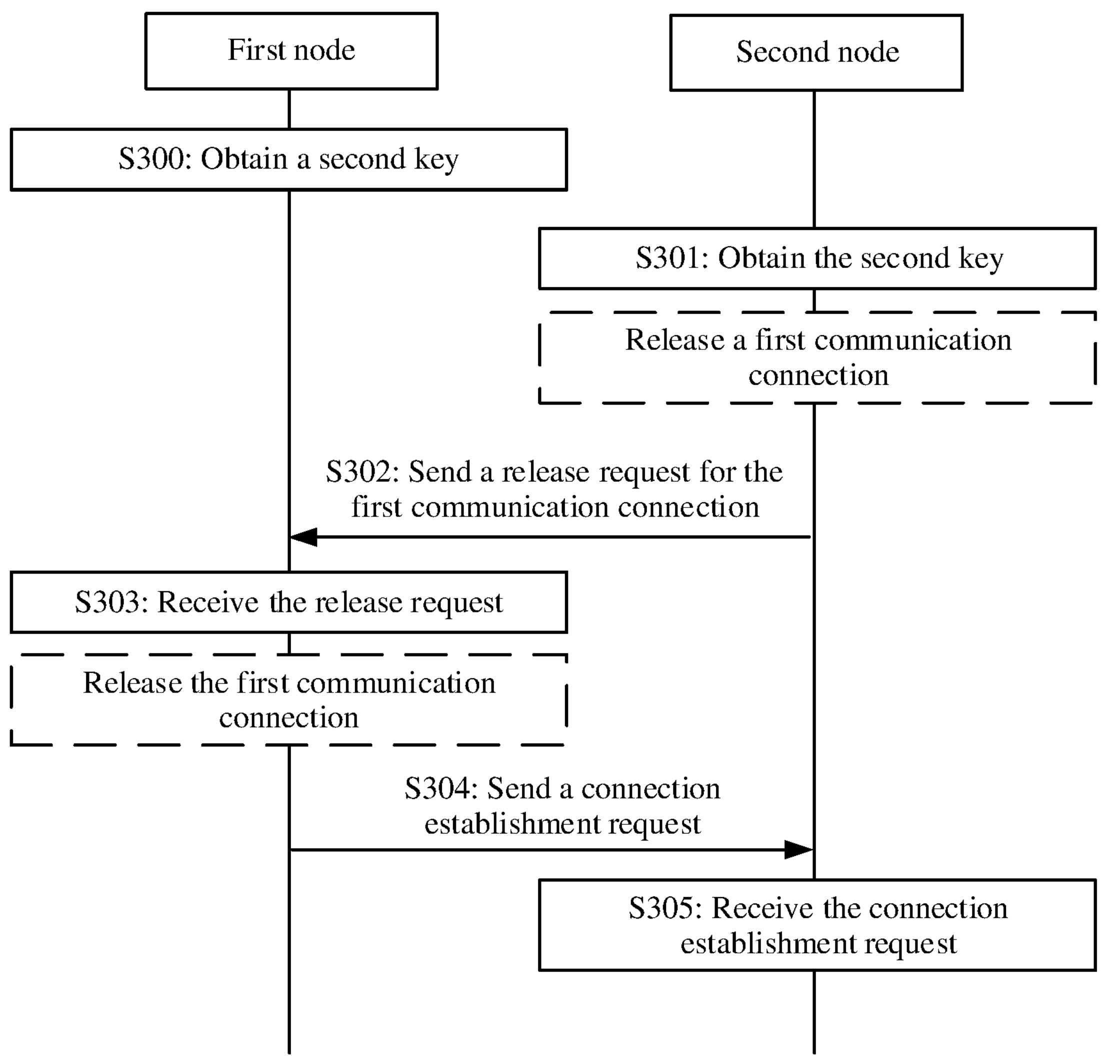
FIG. 3 is a schematic flowchart of a first communication method according to an embodiment of this application.

An embodiment of this application provides a first communication method. FIG. 3 is a flowchart of the method.

S300: A first node obtains a second key used for communication authentication with a second node.

The second key in this embodiment of this application is different from a preconfigured first key.

Optionally, in this embodiment of this application, the first node is configured to perform communication authentication on a first communication connection, and the second node is configured to perform communication authentication on a second communication connection.

It should be understood that, in an optional manner of this application, the first key is a key derived (or negotiated) based on a first communication system, and/or the second key is a key derived (or negotiated) based on a second communication system, and the first communication system is different from the second communication system.

In this application, the first communication system may be a single communication system, for example, a wireless short-range communication system, a 5G cellular network communication system, an ultra-reliable low-latency communication system, an enhanced mobile broadband communication system, or a massive machine connection communication system. In this application, the second communication system may be a communication system obtained after different communication systems are converged, for example, a communication system obtained after a wireless short-range communication system is converged with a 5G cellular network communication system, or a communication system obtained after a 5G cellular network communication system is converged with an ultra-reliable low-latency communication system.

Specifically, the first key may be a key used for authentication in an initial connection phase between the first node and the second node. The first key may be preconfigured before the first node and the second node initially connect to each other. Alternatively, the first key may be determined by the second node and indicated to the first node through signaling. Alternatively, the first key may be determined by the first node and indicated to the second node through signaling. This is not limited in this application.

Specifically, the second key may be determined by the first node after the first node establishes the first communication connection to the second node, and indicated to the second node through signaling. Alternatively, the second key may be determined by the second node after the first node establishes the first communication connection to the second node, and indicated to the first node through signaling. Alternatively, the second key may be jointly negotiated by the first node and the second node after the first node establishes the first communication connection to the second node. This is not limited in this application.

Further, to better ensure security of a communication system, the second key that is obtained by the first node and that is used for communication authentication with the second node has specific time validity. It may be understood that if the second key is valid, the second key may be used for authentication on the second communication connection. Alternatively, if the second key is invalid, the second key cannot be used for authentication on the second communication connection. Further, after the second key is invalid, a key may be updated.

It may be understood that, before S300 is implemented, step 1 may be further included: The first node and the second node are connected in a converged manner (that is, an initial authentication procedure in a convergence scenario of different communication systems is implemented).

An exemplary implementation process of step 1 may be as follows: The first node and the second node perform authentication on an initial connection based on the first key. After the first node and the second node determine that authentication on the initial connection based on the first key succeeds, the first node and the second node establish the first communication connection on which communication authentication is performed based on the first key.

S301: The second node obtains the second key used for communication authentication with the first node.

Specifically, the second key may be determined by the first node after the first node establishes the first communication connection to the second node, and indicated to the second node through signaling. Alternatively, the second key may be determined by the second node after the first node establishes the first communication connection to the second node, and indicated to the first node through signaling. Alternatively, the second key may be jointly negotiated by the first node and the second node after the first node establishes the first communication connection to the second node. This is not limited in this application.

S302: The second node sends a release request for the first communication connection to the first node.

The release request may include one or more of the following information 1 to information 4:

Information 1: request cause information, where the request cause information indicates that a key used for communication authentication is updated.

Information 2: a request time, where the request time indicates a time at which the second node sends the release request. Optionally, the request time may be represented by using a timestamp.

Information 3: a release time, where the release time indicates a time at which the first node releases the first communication connection.

For example, the release time may indicate a specific time. For example, the specific time is the first minute after the first node receives the release request. In this case, after receiving the release request, the first node releases the first communication connection based on the release time included in the release request in the first minute after receiving the release request. Alternatively, the release time may indicate a specific time period. For example, the specific time period is within five minutes after the first node receives the release request. In this case, after receiving the release request, the first node releases the first communication connection within five minutes after receiving the release request based on the release time included in the release request.

Information 4: information that indicates to suspend a radio resource.

Optionally, the release request may further indicate to suspend a radio resource. For example, the release request may include information that indicates to suspend a radio resource corresponding to the first communication connection.

After the first node and the second node determine that the first key used for communication authentication is updated to the second key, when the first communication connection is released and the second communication connection is not successfully established, the radio resource corresponding to the first communication connection is suspended and is not released. This can effectively facilitate fast restoration of a communication link.

It should be noted that content of the information 1 to the information 4 included in the release request is only an example of information included in the release request, and does not constitute a limitation on the information included in the release request.

In addition, that the first node receives a release request from the second node may include but is not limited to:

The release request may be based on an improvement of signaling transmission between the first node and the second node. Alternatively, the release request may be carried in signaling transmission between the first node and the second node. For example, during actual application, the release request may be carried in signaling that is sent by the first node to the second node and that indicates the second key; or the release request may be new signaling between the first node and the second node.

Further, the second node releases the first communication connection to the first node.

It should be understood that, in an optional manner of this application, after receiving the second key, the second node may determine that a key is updated. Therefore, the second node may trigger release of the first communication connection to the first node, and establish the second communication connection on which communication authentication is performed based on the second key.

Further, based on a case in which the second node sends the release request for the first communication connection to the first node, the second node may further receive a release request response that is from the first node and that is used to notify a release status of the first communication connection of the first node.

Optionally, the second node may release the first communication connection to the first node before performing S302, that is, the second node releases the first communication connection to the first node after obtaining the second key. Alternatively, the second node may release the first communication connection to the first node after performing S302, that is, the second node releases the first communication connection to the first node after sending the release request for the first communication connection to the first node. Alternatively, the second node may further release the first communication connection to the first node after receiving the release request response from the first node and determining that the first node completes release of the first communication connection.

S303: The first node receives, from the second node, the release request for the first communication connection.

Further, the first node releases the first communication connection to the second node.

It should be understood that, in an optional manner of this application, after receiving the release request for the first communication connection from the second node, the first node may trigger release of the first communication connection to the second node.

Further, the first node may further send a response that is based on the release request to the second node, to notify the second node of the release status of the first communication connection of the first node.

S304: The first node sends a connection establishment request to the second node, where the connection establishment request is used to request to establish a connection based on the second key.

Optionally, the connection establishment request sent by the first node to the second node may include but is not limited to:

The connection establishment request may be an improvement based on signaling transmission between the first node and the second node. Alternatively, the connection establishment request may be carried in signaling transmission between the first node and the second node. Alternatively, the connection establishment request may be new signaling between the first node and the second node.

The connection establishment request may include one or more of the following information 1 to information 4:

Information 1: request cause information, where the request cause information indicates that a key used for communication authentication is updated.

Information 2: a request time, where the request time indicates a time at which the first node sends the connection establishment request. Optionally, the request time may be represented by using a timestamp.

Information 3: a connection establishment time, where the connection establishment time indicates a time at which the first node is to establish the second communication connection to the second node.

For example, the connection establishment time may indicate a specific time. For example, the specific time is the first minute after the second node receives the connection establishment request. In this case, after receiving the connection establishment request, the second node establishes the second communication connection to the first node at the first minute based on the connection establishment time included in the connection establishment request after receiving the connection establishment request. Alternatively, the connection establishment time may indicate a specific time period. For example, the specific time period is within five minutes after the second node receives the connection establishment request. In this case, after receiving the connection establishment request, the second node establishes, based on the connection establishment time included in the connection establishment request, the second communication connection to the first node within the five minutes after receiving the connection establishment request.

Information 4: information that indicates connection restoration.

It may be understood that the connection establishment request may be a request for restoring a connection between the first node and the second node. That is, after the first communication connection between the first node and the second node is released, the first node and the second node need to establish the second communication connection on which communication authentication is performed based on the second key. In this case, the first node may send a connection restoration request to the second node, and after receiving the connection restoration request, the second node establishes a communication connection to the first node.

It should be noted that content of the information 1 to the information 4 included in the connection establishment request is only an example of information included in the connection establishment request, and does not constitute a limitation on the information included in the connection establishment request.

S305: The second node receives the connection establishment request sent by the first node.

Further, that the connection establishment request is used to request to establish a connection based on the second key may include: The connection establishment request is used to request to perform an authentication and security context negotiation procedure based on the second key.

Optionally, the authentication and security context negotiation procedure may include an identity authentication process of the first node and the second node (for example, interaction of authentication information and an authentication response).

Content of the identity authentication process of the first node and the second node may be described as follows:

First, after the second node receives the connection establishment request sent by the first node, the second node sends authentication information that is based on the second key to the first node, where the authentication information is used to verify an identity of the second node. The authentication information is used to verify the identity of the second node. It may be understood that the first node may verify, by using the authentication information, whether the first node can establish the second communication connection to the second node based on the second key.

Optionally, the authentication information may include an authentication vector derived by the second node by using the second key.

Then, the first node receives the authentication information that is based on the second key and that is from the second node, and after determining that authentication on the second node succeeds, the first node sends an authentication response for the authentication information to the second node, where the authentication response is used to verify an identity of the first node. The authentication response is used to verify the identity of the first node. It may be understood that the second node may verify, by using the authentication response, whether the second node can establish the second communication connection to the first node based on the second key.

Optionally, the first node may determine, based on the authentication vector that is included in the received authentication information and that is derived by the second node by using the second key, whether authentication on the second node succeeds.

For example, after receiving the authentication information, the first node obtains a first authentication vector that is in the authentication information and that is derived by the second node based on the second key. The first node derives a second authentication vector based on the second key, and then compares the first authentication vector with the second authentication vector. If the first authentication vector and the second authentication vector meet an authentication requirement, for example, the authentication requirement may be that the first authentication vector and the second authentication vector are the same, or a sum of the first authentication vector and the second authentication vector is zero, the first node determines that authentication on the second node succeeds. If the first authentication vector and the second authentication vector do not meet the authentication requirement, the first node determines that authentication on the second node fails.

Finally, the second node receives the authentication response sent by the first node, and performs identity authentication on the first node based on the authentication response.

According to the foregoing method, after determining an updated key, the first node and the second node release a connection, and then establish a connection by using the new key. This implements switching between different communication connections, and implements an update process of a key used for communication authentication. This effectively improves communication security.

To better describe the communication method provided in this application, based on content shown in FIG. 3, the following two scenarios are further described in detail. Some steps in the following scenarios may be optional, and a step sequence does not represent an actual execution sequence. Therefore, this application is not limited to performing the following steps and sequences.

Scenario 1: After obtaining the second key, the first node actively releases the first communication connection.

Figure 4A:
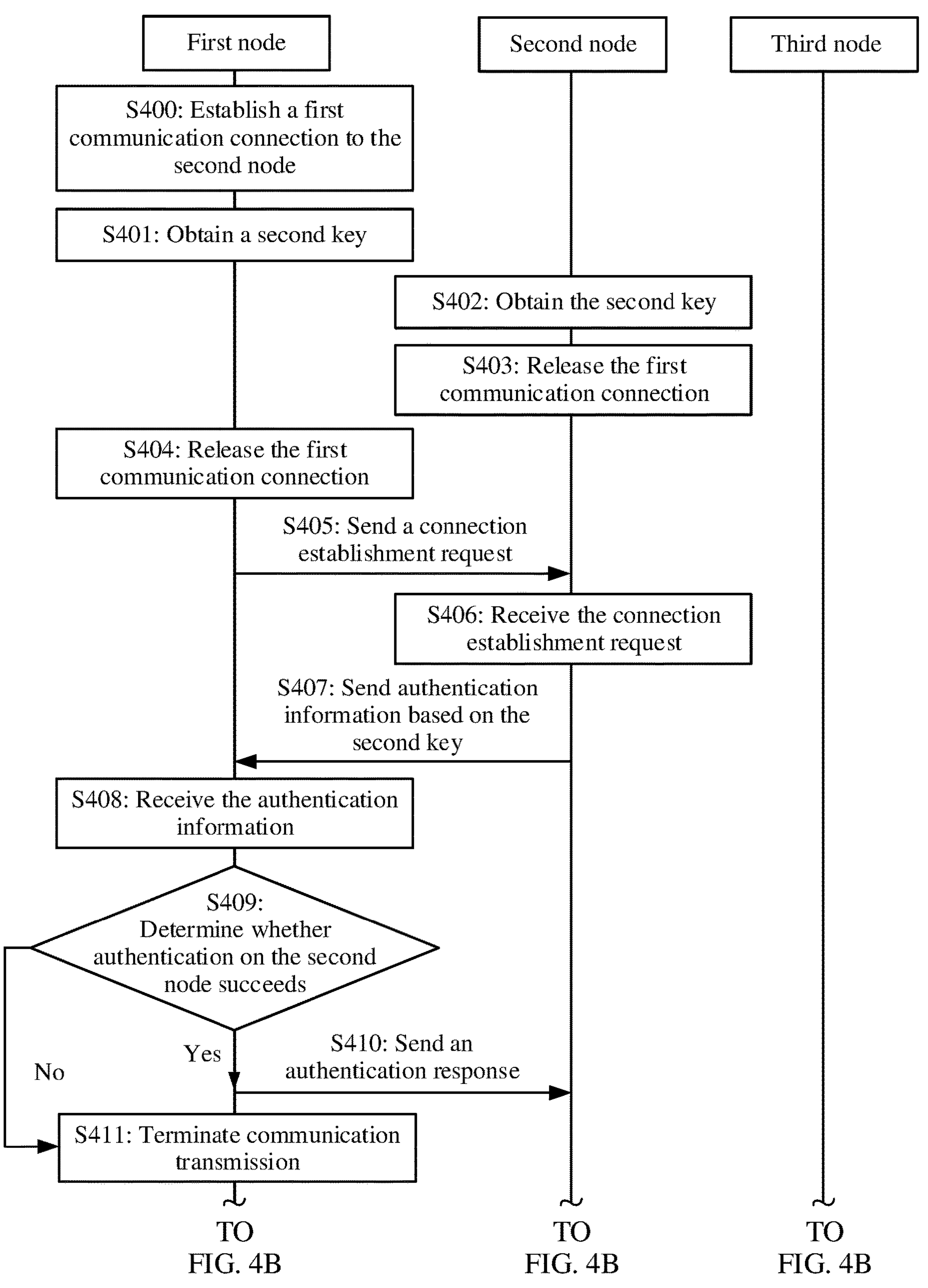
FIG. 4A and FIG. 4B are a schematic flowchart of a second communication method according to an embodiment of this application.
Figure 4B:
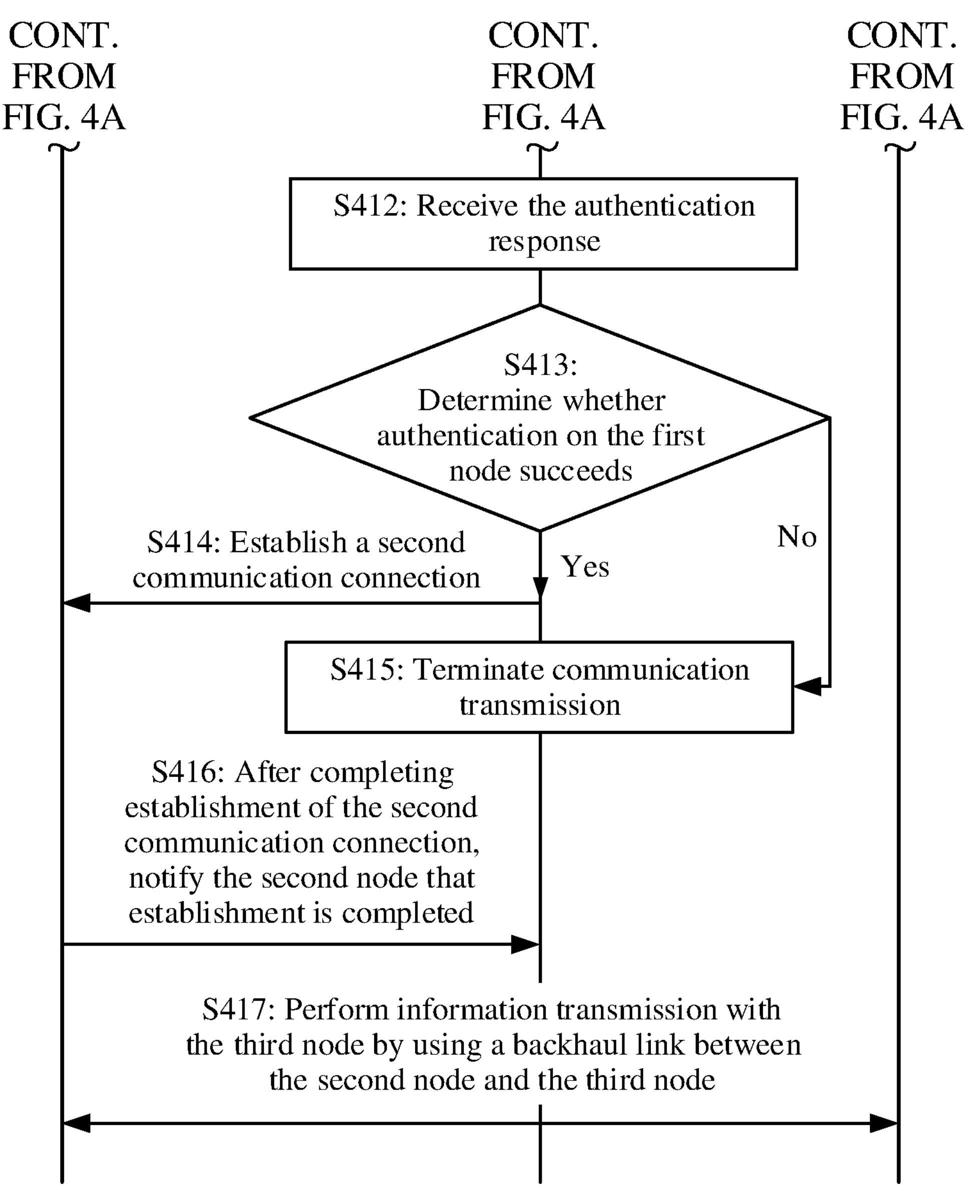

Refer to FIG. 4A and FIG. 4B. The following steps may be performed in a method corresponding to the scenario 1.

S400: A first node establishes a first communication connection to a second node based on a first key.

S401: The first node obtains a second key used for communication authentication with the second node.

S402: The second node obtains the second key used for communication authentication with the first node.

S403: The second node releases the first communication connection to the first node.

S404: The first node releases the first communication connection to the second node.

S405: The first node sends a connection establishment request to the second node, where the connection establishment request is used to request to establish a connection based on the second key.

S406: The second node receives the connection establishment request sent by the first node.

S407: The second node sends authentication information that is based on the second key to the first node, where the authentication information is used to verify an identity of the second node.

S408: The first node receives the authentication information that is based on the second key and that is from the second node.

S409: The first node determines whether authentication on the second node succeeds, and if the authentication on the second node succeeds, performs S410, or if the authentication on the second node fails, performs S411.

S410: The first node sends an authentication response for the authentication information to the second node, where the authentication response is used to verify an identity of the first node, and continues to perform S412.

Optionally, the authentication response includes the authentication information generated based on the second key.

The authentication information may include one or more of the following information 1 and information 2:

Information 1: an authentication vector obtained by the first node based on the second key, for example, the second authentication vector in example content of step S305.

Information 2: a result of authentication performed by the first node on the second node.

It should be noted that content of the information 1 and the information 2 included in the authentication information is only an example of information included in the authentication information, and does not constitute a limitation on the information included in the authentication information.

S411: After determining that authentication performed by the second node on a second communication connection based on the second key fails, the first node terminates communication transmission.

In an optional manner of this application, after the first node determines that authentication on the second node fails, the second node may further reinitiate communication authentication based on the second key, and when a quantity of authentication failures reaches a threshold quantity of failures, communication transmission is terminated.

For example, it is assumed that the threshold quantity of failures is 2. After determining, for the first time, that communication authentication on the second node based on the second key fails, the first node may send an authentication failure message to the second node. After receiving the authentication failure message, the second node may send authentication information that is based on the second key to the first node again, to perform authentication again.

The first node receives authentication information that is based on the second key and that is from the second node again, and performs communication authentication. If the first node determines, in the second authentication, that communication authentication performed by the second node based on the second key still fails, the first node determines that the quantity of authentication failures reaches the threshold quantity 2, and terminates the communication transmission.

Similarly, it may be understood that if the second node consecutively receives two messages indicating that communication authentication based on the second key fails, the second node may terminate the communication transmission. Alternatively, after determining to terminate the communication transmission, the first node may send a message for terminating the communication transmission to the second node, and after receiving the message for terminating the communication transmission from the first node, the second node terminates the communication transmission.

S412: The second node receives the authentication response sent by the first node.

Optionally, the second node that receives the authentication response may determine, based on the authentication information that is generated based on the second key and included in the authentication response, whether authentication on the first node succeeds. For an exemplary determining manner, refer to the foregoing determining manner of the first node. For brevity, details are not described herein again.

S413: The second node determines whether authentication on the first node succeeds, and if the authentication on the first node succeeds, performs S414, or if the authentication on the first node fails, performs S415.

S414: After determining that authentication on the second node succeeds, the second node establishes the second communication connection to the first node, and continues to perform S416.

S415: After determining that authentication performed by the first node on the second communication connection based on the second key fails, the second node terminates communication transmission.

In an optional manner of this application, after the second node determines to terminate the communication transmission, the second node may send a communication transmission termination message to the first node, and after the first node receives the communication transmission termination message from the second node, the first node terminates the communication transmission.

S416: After completing establishment of the second communication connection to the second node, the first node notifies the second node that the establishment of the second communication connection is completed.

S417: The first node performs information transmission with a third node by using a backhaul link between the second node and the third node.

It should be understood that, in a method procedure shown in FIG. 4A and FIG. 4B, sequence numbers of steps do not mean execution sequences. The execution sequences of processes should be determined based on functions and internal logic of the processes, and should not be construed as any limitation on implementation processes of embodiments of this application. For example, S402 may take precedence over S401. In addition, in the method procedure shown in FIG. 4A and FIG. 4B, the foregoing steps are not limited, and any addition, deletion, or variation of the foregoing steps shall fall within the protection scope of this application.

Scenario 2: After receiving the release request that is for the first communication connection and that is sent by the second node, the first node releases the first communication connection.

Figure 5A:
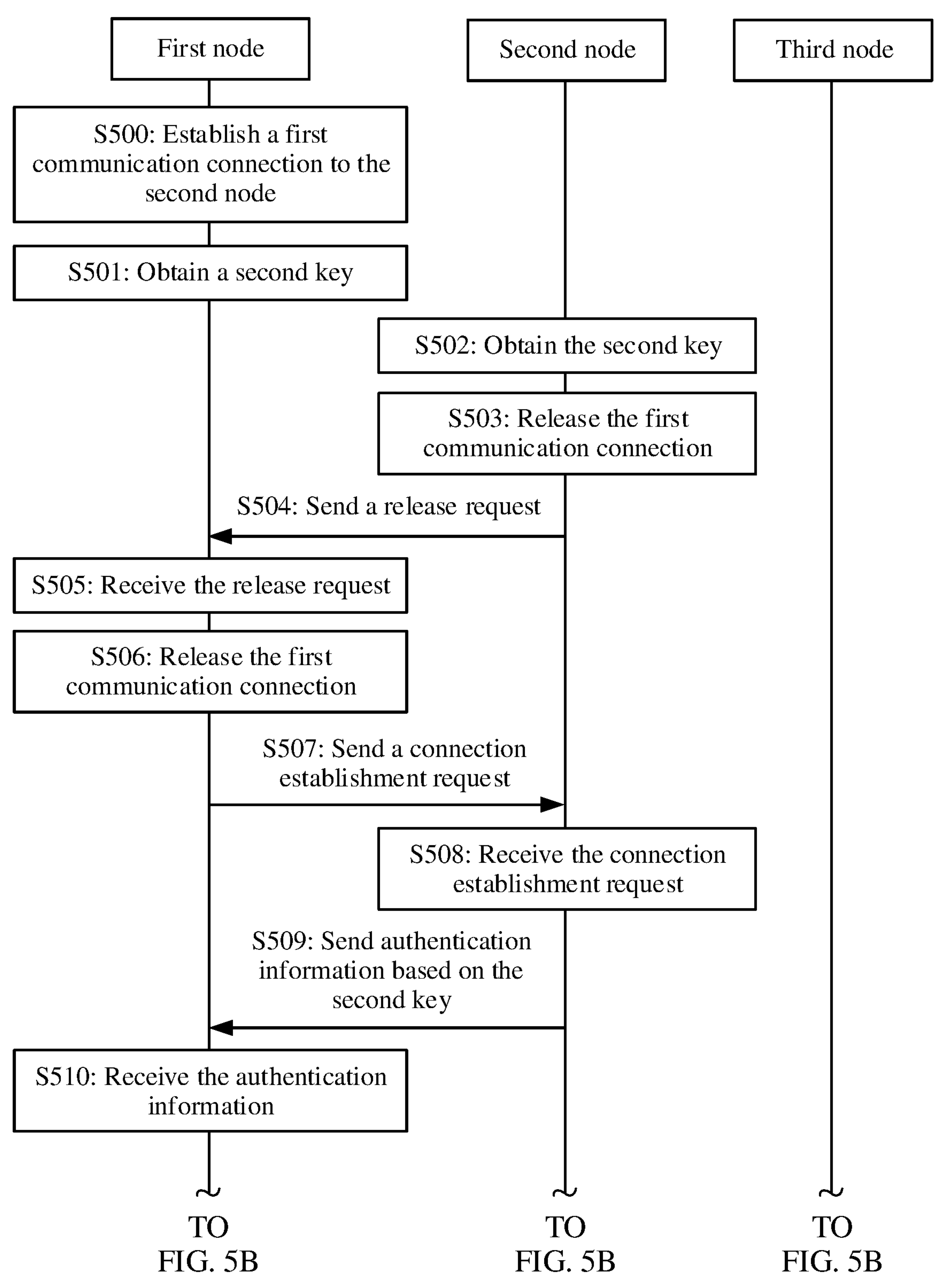
FIG. 5A and FIG. 5B are a schematic flowchart of a third communication method according to an embodiment of this application.
Figure 5B:
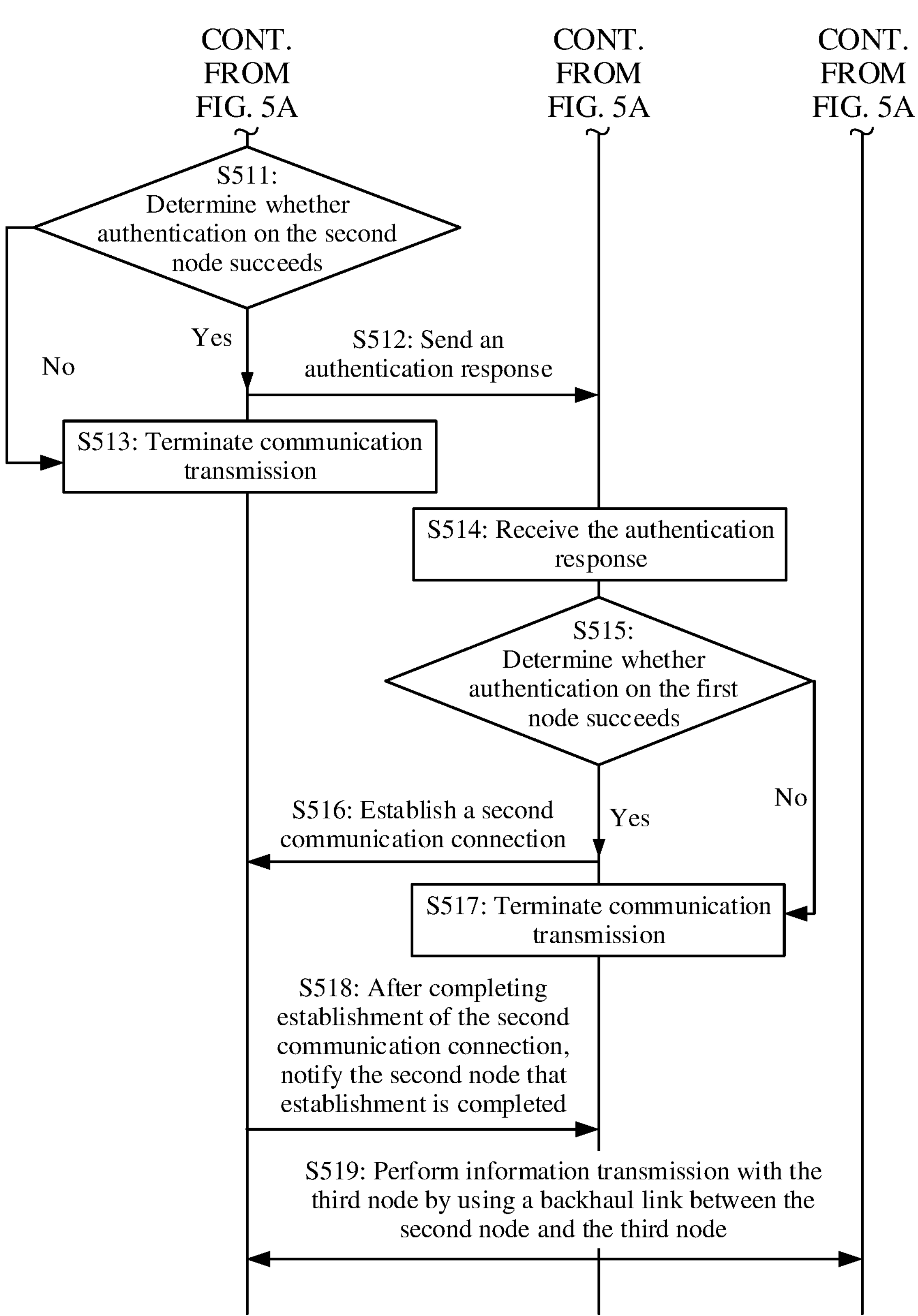

Refer to FIG. 5A and FIG. 5B. The following steps may be performed in a method corresponding to the scenario 2.

S500: A first node establishes a first communication connection to a second node based on a first key.

S501: The first node obtains a second key used for communication authentication with the second node.

S502: The second node obtains the second key used for communication authentication with the first node.

S503: The second node releases the first communication connection to the first node.

S504: The second node sends a release request for the first communication connection to the first node.

S505: The first node receives, from the second node, the release request for the first communication connection.

S506: The first node releases the first communication connection to the second node.

S507: The first node sends a connection establishment request to the second node, where the connection establishment request is used to request to establish a connection based on the second key.

S508: The second node receives the connection establishment request sent by the first node.

S509: The second node sends authentication information that is based on the second key to the first node, where the authentication information is used to verify an identity of the second node.

S510: The first node receives the authentication information that is based on the second key and that is from the second node.

S511: The first node determines whether authentication on the second node succeeds, and if the authentication on the second node succeeds, performs S512, or if the authentication on the second node fails, performs S513.

S512: After determining that the authentication on the second node succeeds, the first node sends an authentication response for the authentication information to the second node, where the authentication response is used to verify an identity of the first node, and continues to perform S514.

S513: After determining that authentication performed by the second node on the second communication connection based on the second key fails, the first node terminates communication transmission.

S514: The second node receives the authentication response sent by the first node.

In this application, optionally, the second node that receives the authentication response may determine, based on the authentication information that is generated based on the second key and included in the authentication response, whether authentication on the first node succeeds. For an exemplary determining manner, refer to the foregoing determining manner of the first node. For brevity, details are not described herein again.

S515: The second node determines whether authentication on the first node succeeds, and if the authentication on the first node succeeds, performs S516, or if the authentication on the first node fails, performs S517.

S516: After determining that authentication on the second node succeeds, the second node establishes the second communication connection to the first node, and continues to perform S518.

S517: After determining that authentication performed by the first node on the second communication connection based on the second key fails, the second node terminates communication transmission.

S518: After completing establishment of the second communication connection to the second node, the first node notifies the second node that the establishment of the second communication connection is completed.

S519: The first node performs information transmission with a third node by using a backhaul link between the second node and the third node.

It should be understood that, in a method procedure shown in FIG. 5A and FIG. 5B, sequence numbers of steps do not mean execution sequences. The execution sequences of processes should be determined based on functions and internal logic of the processes, and should not be construed as any limitation on implementation processes of embodiments of this application. For example, S502 may take precedence over S501. In addition, in the method procedure shown in FIG. 5A and FIG. 5B, the foregoing steps are not limited, and any addition, deletion, or variation of the foregoing steps shall fall within the protection scope of this application.

Further, in this application, to effectively reduce system overheads, the second node may further suspend the backhaul link after releasing the first communication connection to the first node. Then, after determining that the second communication connection to the first node is successfully established, the second node may activate the backhaul link.

Figure 6A:
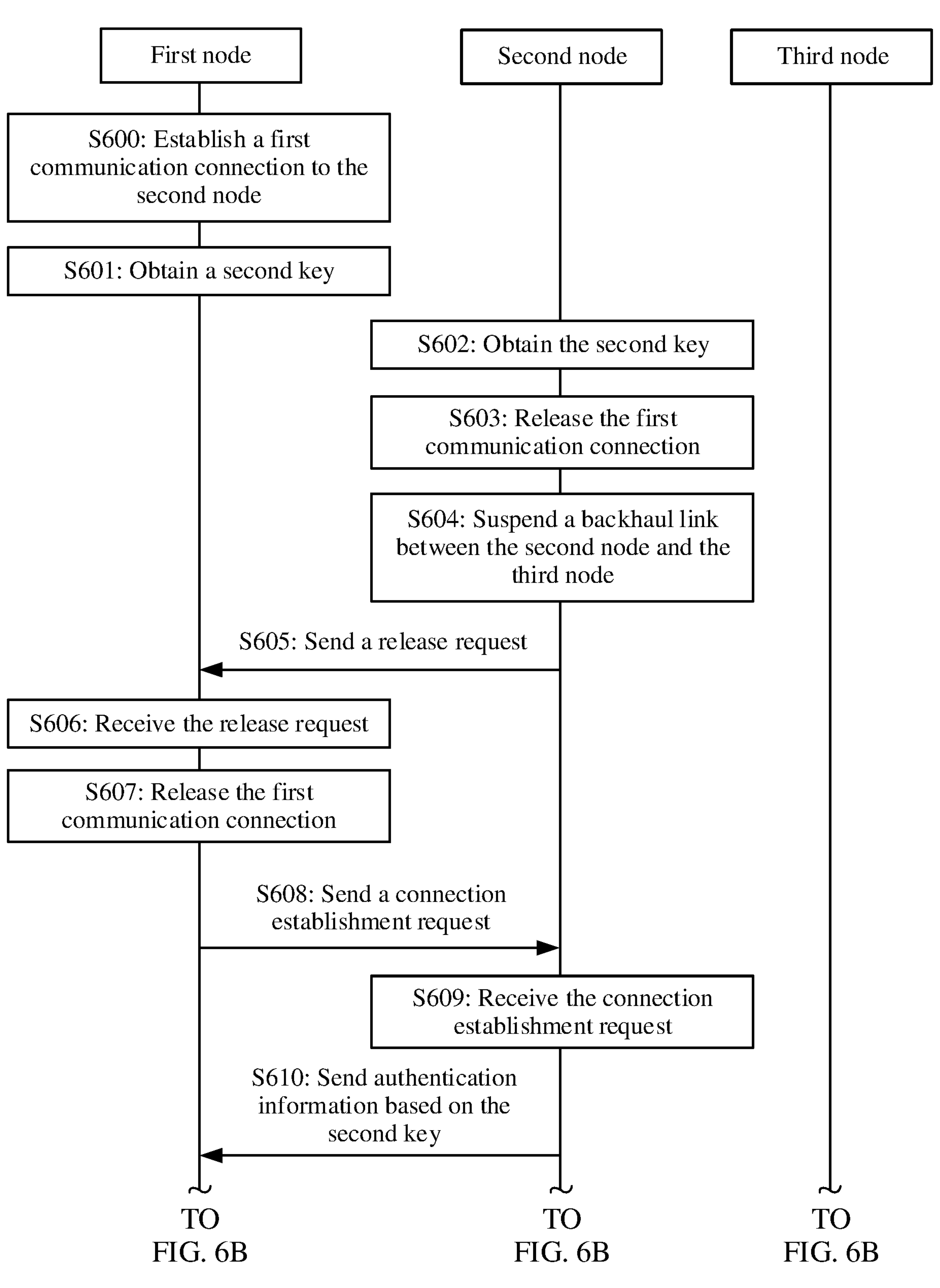
FIG. 6A and FIG. 6B are a schematic flowchart of a fourth communication method according to an embodiment of this application.
Figure 6B:
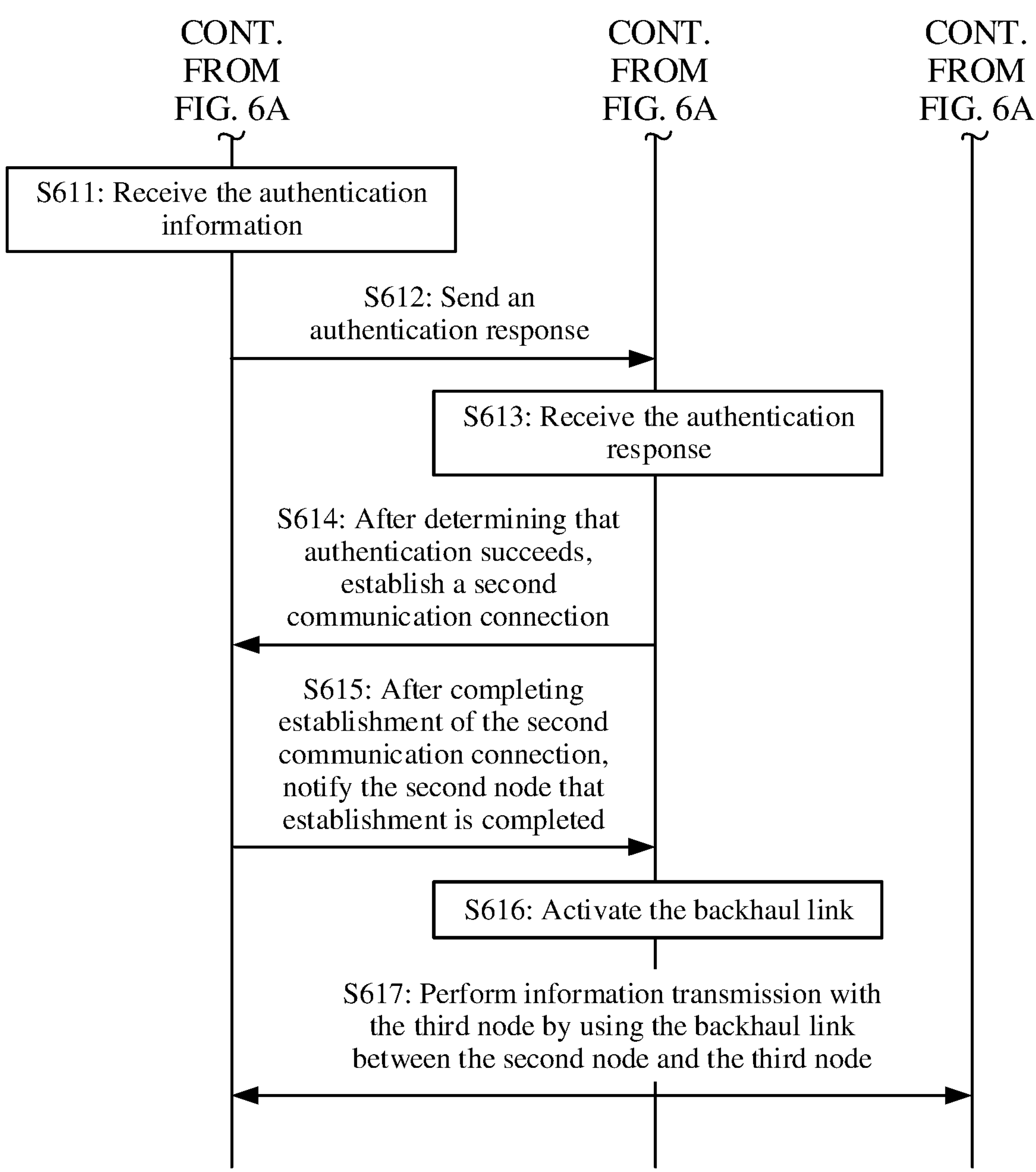

With reference to the foregoing scenario 2, the following describes operation content of suspending and activating a backhaul link in a communication process. Refer to FIG. 6A and FIG. 6B. A corresponding method procedure is as follows:

S600: A first node establishes a first communication connection to a second node based on a first key.

S601: A first node obtains a second key used for communication authentication with a second node.

S602: The second node obtains the second key used for communication authentication with the first node.

S603: The second node releases the first communication connection to the first node.

S604: The second node suspends a backhaul link between the second node and a third node.

S605: The second node sends a release request for the first communication connection to the first node.

S606: The first node receives, from the second node, the release request for the first communication connection.

S607: The first node releases the first communication connection to the second node.

S608: The first node sends a connection establishment request to the second node, where the connection establishment request is used to request to establish a connection based on the second key.

S609: The second node receives the connection establishment request sent by the first node.

S610: The second node sends authentication information that is based on the second key to the first node, where the authentication information is used to verify an identity of the second node.

S611: The first node receives the authentication information that is based on the second key and that is from the second node.

S612: After determining that authentication on the second node succeeds, the first node sends an authentication response for the authentication information to the second node, where the authentication response is used to verify an identity of the first node.

S613: The second node receives the authentication response sent by the first node.

S614: After determining that authentication on the second node succeeds, the second node establishes a second communication connection to the first node.

S615: After completing establishment of the second communication connection to the second node, the first node notifies the second node that the establishment of the second communication connection is completed.

S616: The second node activates the backhaul link after determining that the second communication connection to the first node is successfully established.

S617: The first node performs information transmission with the third node by using the backhaul link between the second node and the third node.

It should be understood that, in a method procedure shown in FIG. 6A and FIG. 6B, sequence numbers of steps do not mean execution sequences. The execution sequences of processes should be determined based on functions and internal logic of the processes, and should not be construed as any limitation on implementation processes of embodiments of this application. For example, S605 may take precedence over S604. In addition, in the method procedure shown in FIG. 6A and FIG. 6B, the foregoing steps are not limited, and any addition, deletion, or variation of the foregoing steps shall fall within the protection scope of this application.

In this application, a backhaul link is suspended after a connection is released, and the backhaul link is activated after a connection is established. This can effectively reduce system power consumption, and can save resources.

With reference to the case in the foregoing scenario 1, content of suspending and activating the backhaul link in the communication process is similar to content in FIG. 6A and FIG. 6B. For brevity, refer to the content in FIG. 6A and FIG. 6B and the case in the foregoing scenario 1. Steps S605 and S606 in FIG. 6A are deleted to obtain content of suspending and activating the backhaul link in the communication process with reference to the case in the foregoing scenario 1. Details are not described herein again.

Further, in this application, to better ensure time validity of the second key and improve communication transmission security, in a process in which the first node and the second node perform communication transmission by using the second key, whether the second key is valid may be further verified.

It may be understood that, in this application, the first node may determine whether the second key is valid, and then notify the second node of a determining result of the second key. Alternatively, the second node may determine whether the second key is valid, and then notify the first node of a determining result of the second key. Alternatively, both the first node and the second node may determine validity of the second key.

In an optional manner of this application, the second key is valid within first duration, and the first duration may be defined by using a timer or a timestamp. The first duration may start timing from a first moment. The first moment may be a moment at which the first communication connection is released, or a moment at which the second node receives the connection establishment request and/or a moment at which the first node sends the connection establishment request. This is not specifically limited.

The following describes a case with reference to the foregoing scenario 2 and a case in which both the first node and the second node are selected to determine validity of the second key. This application provides a plurality of verification manners, which are not specifically limited to the following several manners.

Manner 1: The first node and the second node separately determine, based on respective corresponding timers, whether the second key is valid.

Figure 7A:
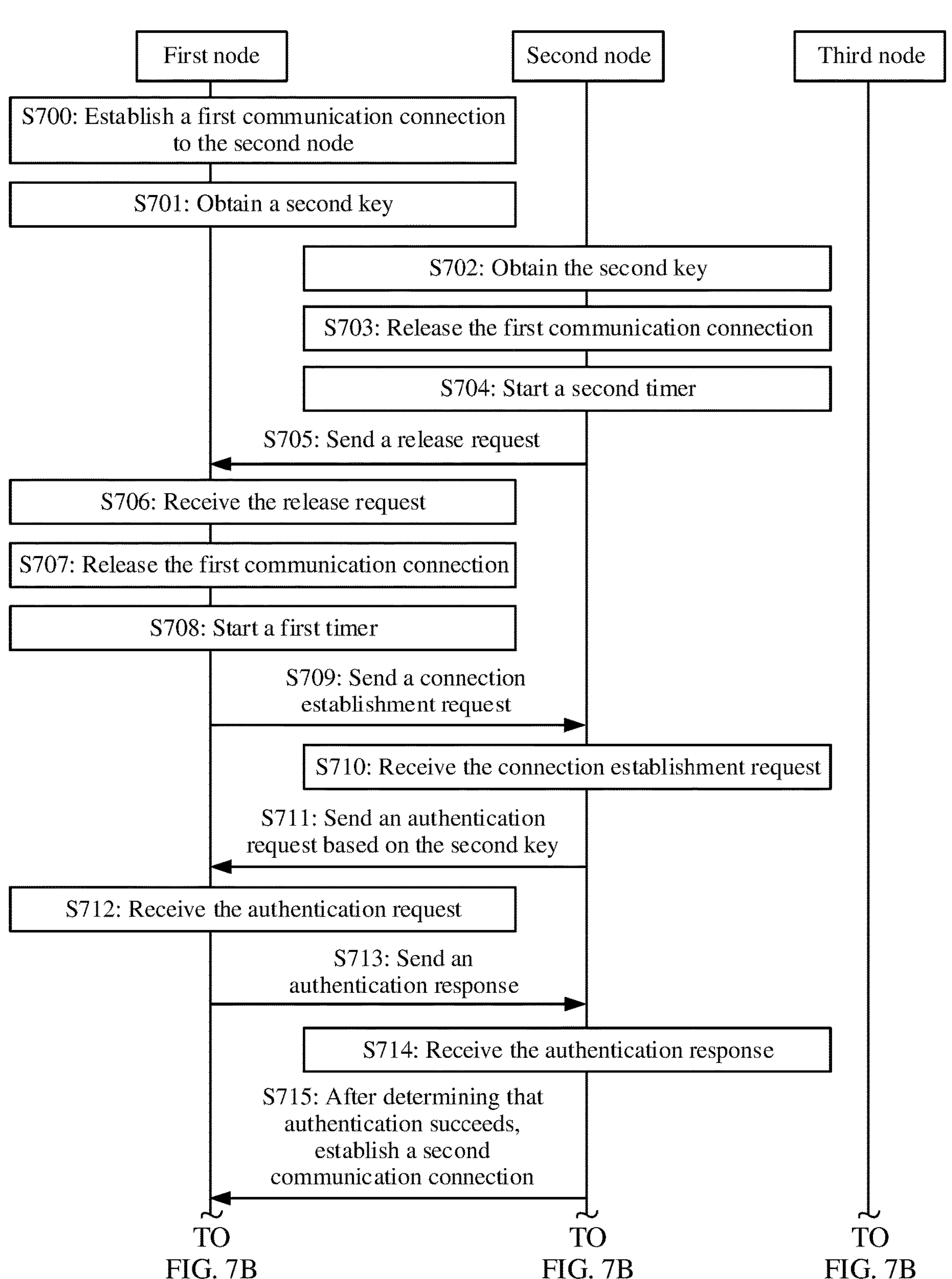
FIG. 7A and FIG. 7B are a schematic flowchart of a fifth communication method according to an embodiment of this application.
Figure 7B:
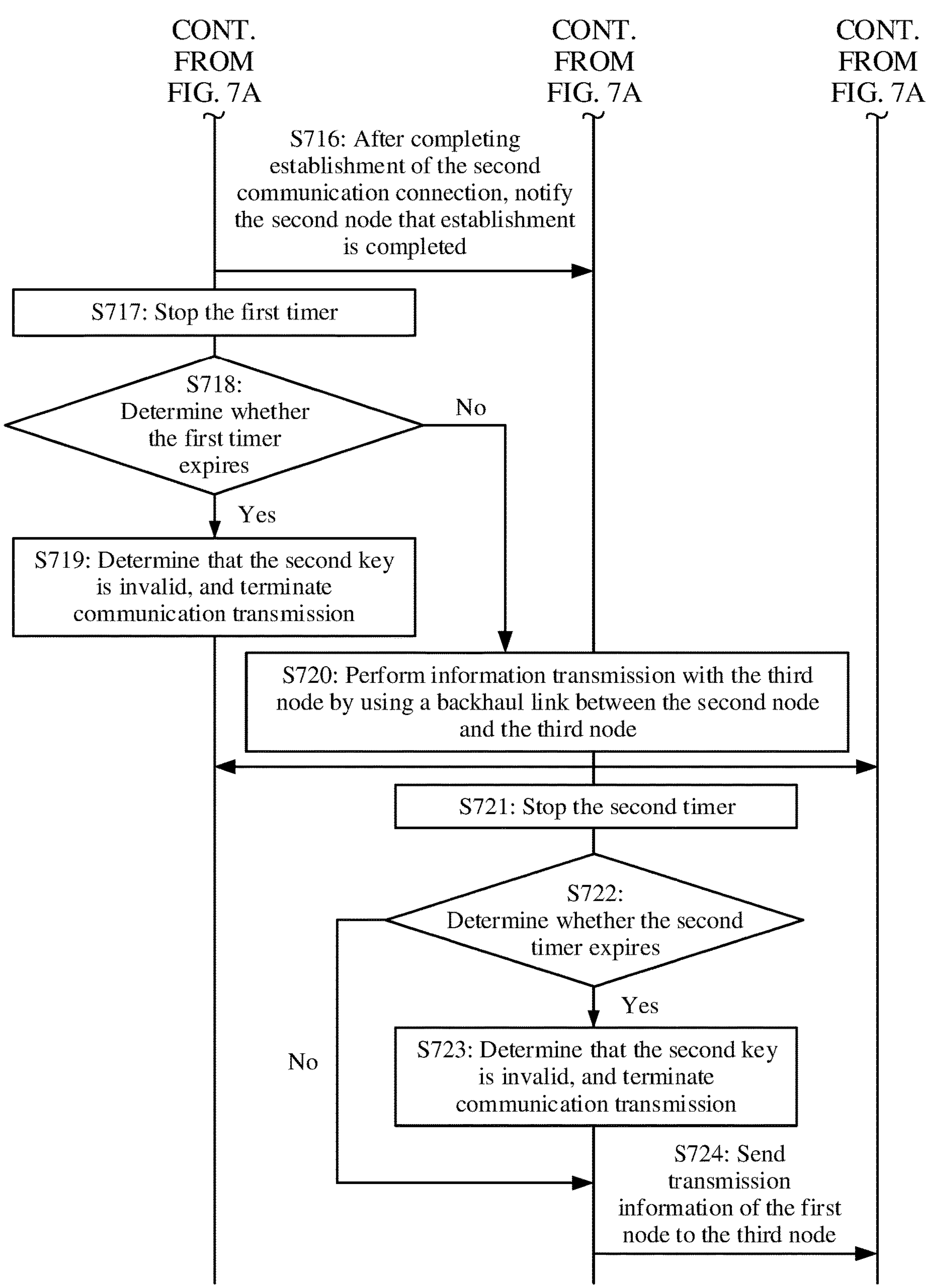

Refer to FIG. 7A and FIG. 7B. A method procedure corresponding to the manner 1 is as follows:

S700: A first node establishes a first communication connection to a second node based on a first key.

S701: The first node obtains a second key used for communication authentication with the second node.

S702: The second node obtains the second key used for communication authentication with the first node.

S703: The second node releases the first communication connection to the first node.

S704: The second node starts a corresponding second timer used to determine validity of the second key.

Normal running duration of the second timer is first duration.

S705: The second node sends a release request for the first communication connection to the first node.

S706: The first node receives, from the second node, the release request for the first communication connection.

S707: The first node releases the first communication connection to the second node.

S708: The first node starts a corresponding first timer used to determine validity of the second key.

Normal running duration of the first timer is first duration.

S709: The first node sends a connection establishment request to the second node, where the connection establishment request is used to request to establish a connection based on the second key.

S710: The second node receives the connection establishment request sent by the first node.

S711: The second node sends authentication information that is based on the second key to the first node, where the authentication information is used to verify an identity of the second node.

S712: The first node receives the authentication information that is based on the second key and that is from the second node.

S713: After determining that authentication on the second node succeeds, the first node sends an authentication response for the authentication information to the second node, where the authentication response is used to verify an identity of the first node.

S714: The second node receives the authentication response sent by the first node.

S715: After determining that the authentication on the second node succeeds, the second node establishes a second communication connection to the first node.

S716: After completing establishment of the second communication connection to the second node, the first node notifies the second node that the establishment of the second communication connection is completed.

S717: The first node stops the corresponding first timer.

S718. The first node determines whether the first timer expires, and if the first timer expires, performs S719, or if the first timer does not expire, performs S720.

S719: The first node determines that the second key is invalid, and terminates communication transmission.

S720: The first node performs information transmission with a third node by using a backhaul link between the second node and the third node.

S721: The second node stops the corresponding second timer after receiving a notification that is from the first node and that indicates that establishment of the second communication connection is completed.

S722: The second node determines whether the second timer expires, and if the second timer expires, performs S723, or if the second timer does not expire, performs S724.

S723: The second node determines that the second key is invalid, and terminates communication transmission.

S724: The second node sends transmission information from the first node to the third node by using the backhaul link between the second node and the third node.

In this application, optionally, in the method procedure shown in FIG. 7A and FIG. 7B, a moment at which the first node starts the corresponding first timer is not limited to a moment after step S707 is performed. For example, the moment at which the first node starts the corresponding first timer may alternatively be after step S709 is performed. Similarly, a moment at which the second node starts the corresponding second timer is not limited to a moment after step S704 is performed. For example, the moment at which the second node starts the corresponding second timer may alternatively be after step S710 is performed.

It should be understood that, in a method procedure shown in FIG. 7A and FIG. 7B, sequence numbers of steps do not mean execution sequences. The execution sequences of processes should be determined based on functions and internal logic of the processes, and should not be construed as any limitation on implementation processes of embodiments of this application. For example, S702 may take precedence over S701. In addition, in the method procedure shown in FIG. 7A and FIG. 7B, the foregoing steps are not limited, and any addition, deletion, or variation of the foregoing steps shall fall within the protection scope of this application.

With reference to the case in the scenario 1, content of determining the validity of the second key in the manner 1 is similar to content in FIG. 7A and FIG. 7B. For brevity, refer to the content in FIG. 7A and FIG. 7B and the case in the scenario 1, and steps S705 and S706 in FIG. 7A are deleted to obtain content of determining the validity of the second key in the manner 1 with reference to the case in the scenario 1. Details are not described herein again.

Manner 2: The first node and the second node jointly maintain a same timer, and determine whether the second key is valid.

Figure 8A:
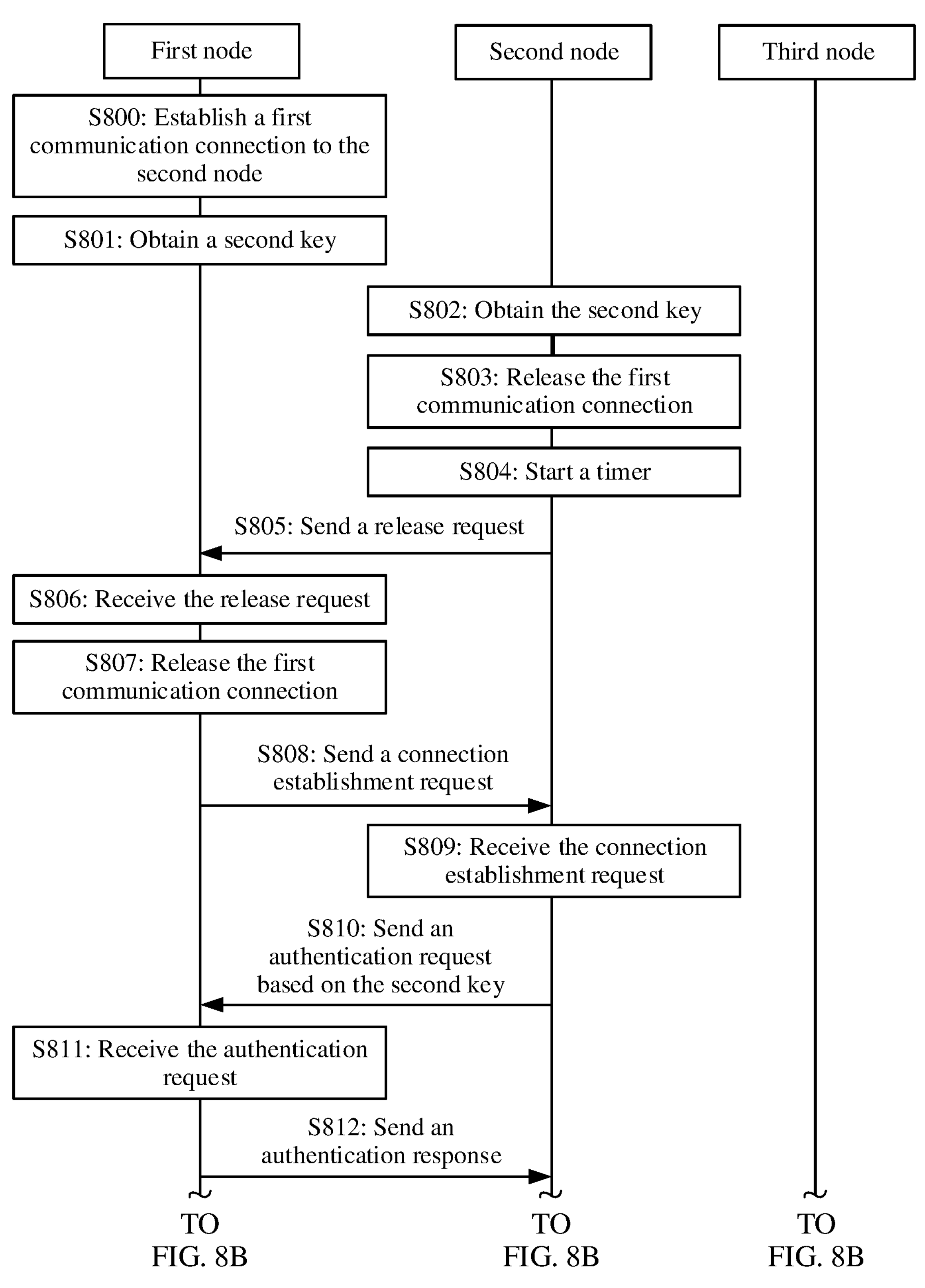
FIG. 8A and FIG. 8B are a schematic flowchart of a sixth communication method according to an embodiment of this application.
Figure 8B:
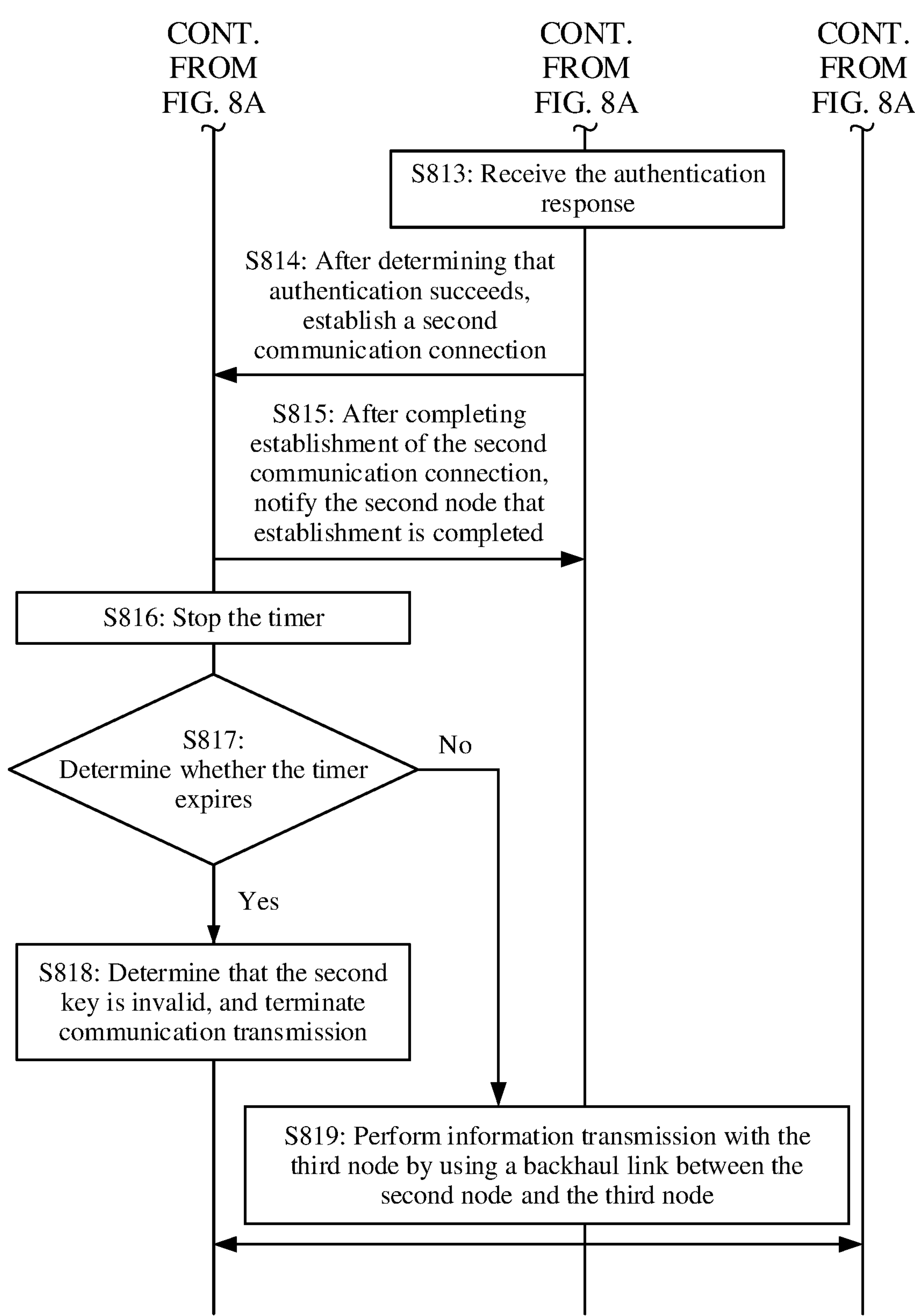

Refer to FIG. 8A and FIG. 8B. A method procedure corresponding to the manner 2 is as follows:

S800: A first node establishes a first communication connection to a second node based on a first key.

S801: The first node obtains a second key used for communication authentication with the second node.

S802: The second node obtains the second key used for communication authentication with the first node.

S803: The second node releases the first communication connection to the first node.

S804: The second node starts a timer used to determine validity of the second key.

S805: The second node sends a release request for the first communication connection to the first node.

S806: The first node receives, from the second node, the release request for the first communication connection.

S807: The first node releases the first communication connection to the second node.

S808: The first node sends a connection establishment request to the second node, where the connection establishment request is used to request to establish a connection based on the second key.

S809: The second node receives the connection establishment request sent by the first node.

S810: The second node sends authentication information that is based on the second key to the first node, where the authentication information is used to verify an identity of the second node.

S811: The first node receives the authentication information that is based on the second key and that is from the second node.

S812: After determining that authentication on the second node succeeds, the first node sends an authentication response for the authentication information to the second node, where the authentication response is used to verify an identity of the first node.

S813: The second node receives the authentication response sent by the first node.

S814: After determining that the authentication on the second node succeeds, the second node establishes a second communication connection to the first node.

S815: After completing establishment of the second communication connection to the second node, the first node notifies the second node that the establishment of the second communication connection is completed.

S816: The first node stops the timer.

S817: The first node determines whether the timer expires, and if the timer expires, performs S818, or if the timer does not expire, performs S819.

S818: The first node determines that the second key is invalid, and terminates communication transmission.

In this application, optionally, the first node may further notify the second node of a result that the second key is invalid.

S819: The first node performs information transmission with a third node by using a backhaul link between the second node and the third node.

It may be understood that, in the method procedure shown in FIG. 8A and FIG. 8B, the first node may alternatively start the timer, and the second node may stop the timer. For example, after performing S807, the first node starts the timer, and the second node stops the timer after receiving a notification that is sent by the first node and that indicates that establishment of the second communication connection is completed in S815. Similarly, the second node may determine whether the timer expires, to determine whether the second key is valid.

It should be understood that, in a method procedure shown in FIG. 8A and FIG. 8B, sequence numbers of steps do not mean execution sequences. The execution sequences of processes should be determined based on functions and internal logic of the processes, and should not be construed as any limitation on implementation processes of embodiments of this application. For example, S802 may take precedence over S801. In addition, in the method procedure shown in FIG. 8A and FIG. 8B, the foregoing steps are not limited, and any addition, deletion, or variation of the foregoing steps shall fall within the protection scope of this application.

With reference to the case in the scenario 1, content of determining the validity of the second key in the manner 2 is similar to content in FIG. 8A and FIG. 8B. For brevity, refer to the content in FIG. 8A and FIG. 8B and the case in the scenario 1, and steps S805 and S806 in FIG. 8A are deleted to obtain content of determining the validity of the second key in the manner 2 with reference to the case in the scenario 1. Details are not described herein again.

Manner 3: The first node and the second node determine, based on a timestamp carried in signaling, whether the second key is valid.

Figure 9A:
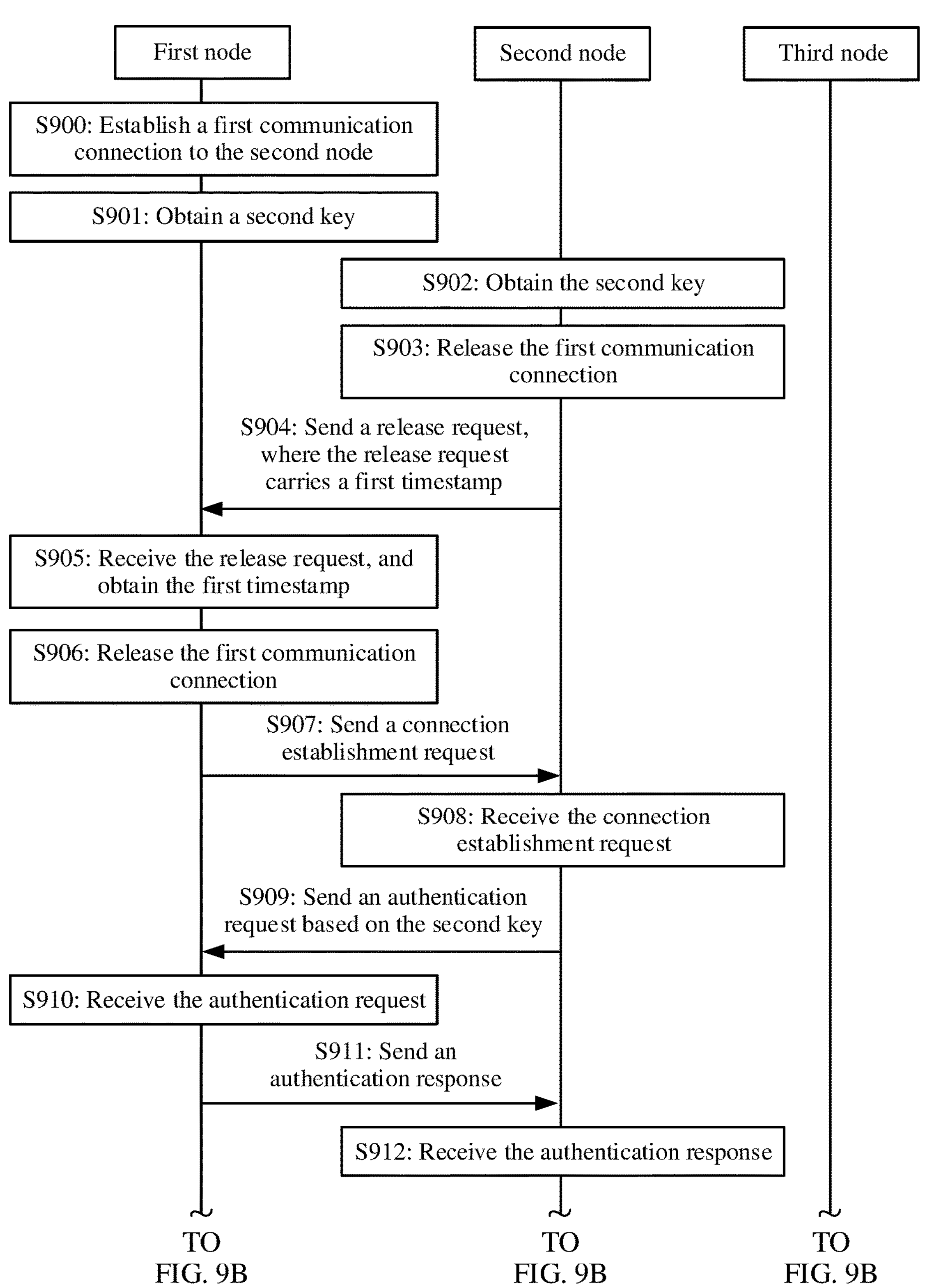
FIG. 9A to FIG. 9C are a schematic flowchart of a sixth communication method according to an embodiment of this application.
Figure 9B:
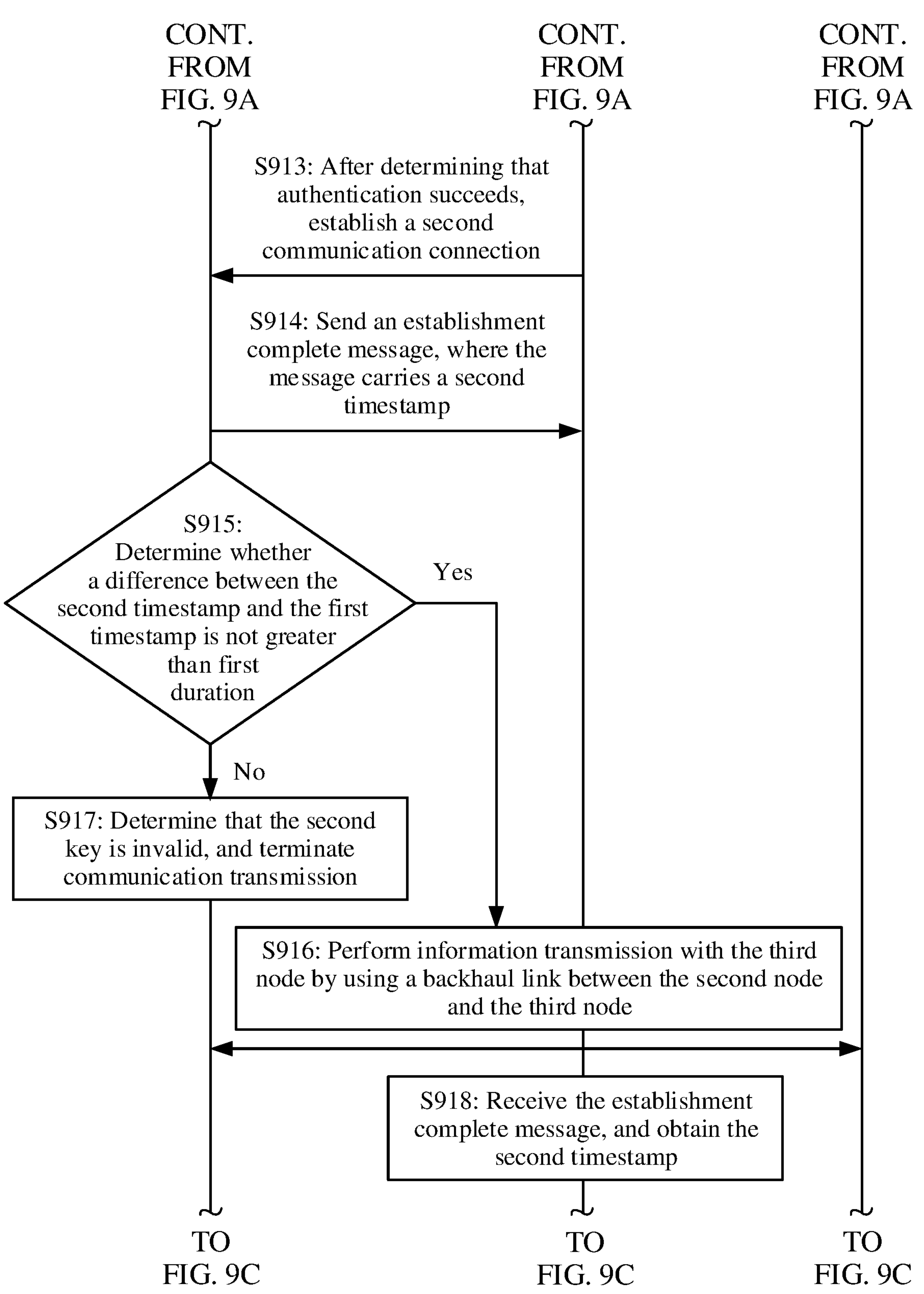
Figure 9C:
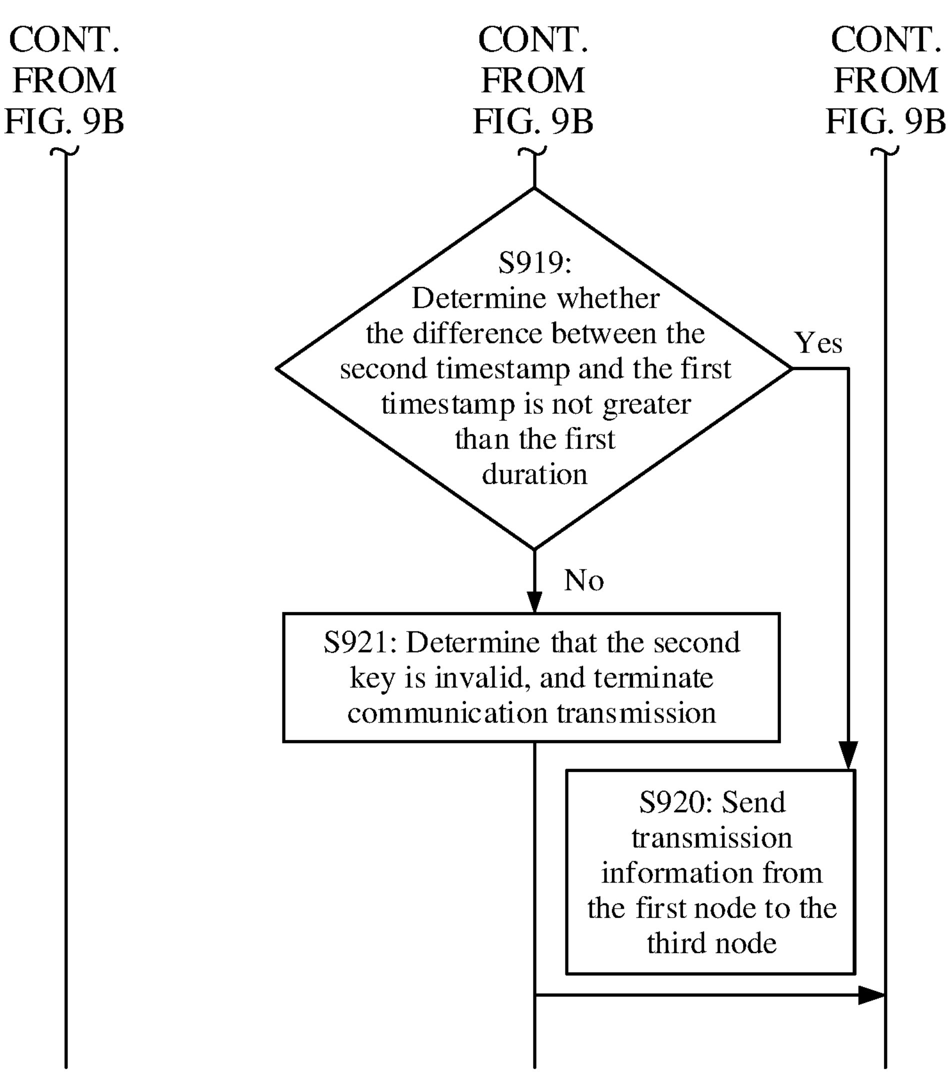

Refer to FIG. 9A to FIG. 9C. A method procedure corresponding to the manner 3 is as follows:

S900: A first node establishes a first communication connection to a second node based on a first key.

S901: The first node obtains a second key used for communication authentication with the second node.

S902: The second node obtains the second key used for communication authentication with the first node.

S903: The second node releases the first communication connection to the first node.

S904: The second node sends a release request for the first communication connection to the first node, where the release request carries a first timestamp.

The first timestamp may be a time at which the second node sends the release request to the first node.

In this application, optionally, after sending the release request to the first node, the second node records the first timestamp.

S905: The first node receives, from the second node, the release request for the first communication connection, and obtains the first timestamp.

S906: The first node releases the first communication connection to the second node.

S907: The first node sends a connection establishment request to the second node, where the connection establishment request is used to request to establish a connection based on the second key.

S908: The second node receives the connection establishment request sent by the first node.

S909: The second node sends authentication information that is based on the second key to the first node, where the authentication information is used to verify an identity of the second node.

S910: The first node receives the authentication information that is based on the second key and that is from the second node.

S911: After determining that authentication on the second node succeeds, the first node sends an authentication response for the authentication information to the second node, where the authentication response is used to verify an identity of the first node.

S912: The second node receives the authentication response sent by the first node.

S913: After determining that the authentication on the second node succeeds, the second node establishes a second communication connection to the first node.

S914: After completing establishment of the second communication connection to the second node, the first node sends an establishment complete message to the second node, where the establishment complete message carries a second timestamp.

The establishment complete message is used to notify the second node that the first node has completed establishment of the second communication connection.

The second timestamp may be a time at which the first node sends the establishment complete message to the second node. Alternatively, the second timestamp may be a time at which the first node completes establishment of the second communication connection.

In this application, optionally, the first node records the second timestamp.

S915: The first node determines whether a time difference between the second timestamp and the first timestamp is not greater than first duration, and if the time difference between the second timestamp and the first timestamp is not greater than the first duration, performs S916, or if the time difference between the second timestamp and the first timestamp is greater than the first duration, performs S917.

S916: The first node performs information transmission with a third node by using a backhaul link between the second node and the third node.

S917: The first node determines that the second key is invalid, and terminates communication transmission.

S918: After receiving the establishment complete message, the second node obtains the second timestamp.

S919: The second node determines whether the time difference between the second timestamp and the first timestamp is not greater than the first duration, and if the time difference between the second timestamp and the first timestamp is not greater than the first duration, performs S920, or if the time difference between the second timestamp and the first timestamp is greater than the first duration, performs S921.

S920: The second node sends transmission information from the first node to the third node by using the backhaul link between the second node and the third node.

S921: The second node determines that the second key is invalid, and terminates communication transmission.

It should be understood that the method procedure shown in FIG. 9A to FIG. 9C is only an example in which the first node and the second node determine, by using timestamps, whether the second key is valid, and does not constitute a limitation on a method for determining, by using the timestamps, whether the second key is valid, and does not limit the foregoing steps. Any addition, deletion, or variation of the foregoing steps shall fall within the protection scope of this application.

With reference to the case in the scenario 1, content of determining the validity of the second key in the manner 3 is similar to content in FIG. 9A to FIG. 9C. For brevity, refer to the content in FIG. 9A to FIG. 9C and the case in the scenario 1, and steps S904 and S905 in FIG. 9A are deleted to obtain content of determining the validity of the second key in the manner 3 with reference to the case in the scenario 1. Details are not described herein again.

In this application, in a process in which the first node and the second node perform communication transmission by using the second key, whether the second key is valid is further verified. This can ensure time validity of the second key, and can better ensure security of communication transmission.

So far, the communication system in this application and the implemented communication method are described in detail with reference to FIG. 3 to FIG. 9C. In this communication solution, this application provides a communication method in a scenario in which different communication systems perform converged communication. This effectively improves communication security.

In addition, content in FIG. 3 to FIG. 9C does not constitute a limitation on the communication method provided in this application. Any variation of the content in FIG. 3 to FIG. 9C falls within the protection scope of this application. For example, the content in FIG. 4A and FIG. 4B, FIG. 6A and FIG. 6B, and FIG. 7A and FIG. 7B may be combined, to obtain a communication solution in which the backhaul link is suspended and activated and validity of the second key is verified in the scenario 1 in this application. This can better reduce system overheads and improve communication security.

The method and the apparatus are conceived based on a same or similar technical concept. The method and the apparatus have similar principles for resolving the problems. Therefore, for implementation of the apparatus and the method, refer to each other. Details of repeated parts are not described. The terms "system" and "network" may be used interchangeably in embodiments of this application. In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more. In addition, it should be understood that, in the description of this application, terms such as "first", "second", and "third" are merely used for distinguishing and description, but should not be understood as an indication or implication of relative importance, or should not be understood as an indication or implication of a sequence. Reference to "an embodiment", "some embodiments", or the like described in this specification means that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The apparatus provided in embodiments of this application is described below in detail with reference to FIG. 10 and FIG. 11. It should be understood that descriptions of the apparatus embodiments correspond to descriptions of the method embodiments. Therefore, for content that is not described in detail, refer to each other.

Figure 10:
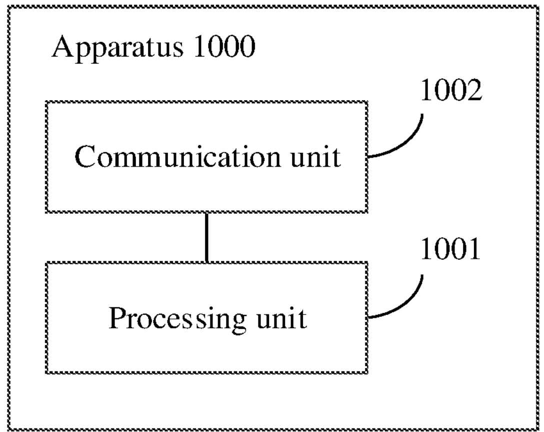
FIG. 10 is a schematic diagram of a structure of a first communication apparatus according to an embodiment of this application.

FIG. 10 is a schematic block diagram of an apparatus 1000 according to an embodiment of this application, and the apparatus 1000 is configured to implement functions of the first apparatus or the second apparatus in the foregoing method embodiments. For example, the apparatus may be a software module or a chip system. The chip may include a chip, or may include a chip and another discrete component. The apparatus 1000 includes a processing unit 1001 and a communication unit 1002. The communication unit 1002 is configured to communicate with another device, and may also be referred to as a communication interface, a transceiver unit, an input/output interface, or the like.

In some embodiments, the apparatus 1000 may be configured to implement functions of the first apparatus in the foregoing method. The apparatus 1000 may be the first apparatus, or a chip, a circuit, or the like configured in the first apparatus. The processing unit 1001 may be configured to perform a processing-related operation of the first apparatus in the foregoing method embodiments, and the communication unit 1002 is configured to indicate a receiving and sending-related operation of the first apparatus in the foregoing method embodiments.

For example, the processing unit 1001 is configured to obtain a second key used for communication authentication with a second node, where the second key is different from a preconfigured first key. The communication unit 1002 is configured to receive a release request for a first communication connection from the second node, where the first key is used for communication authentication on the first communication connection. The communication unit 1002 is further configured to send a connection establishment request to the second node, where the connection establishment request is used to request to establish a connection based on the second key.

Optionally, that the connection establishment request is used to request to establish a connection based on the second key includes: The connection establishment request is used to request to perform an authentication and security context negotiation procedure based on the second key.

Optionally, the communication unit 1002 is further configured to receive authentication information that is based on the second key and that is from the second node, where the authentication information is used to verify an identity of the second node.

Optionally, that the authentication information is used to verify an identity of the second node includes that the authentication information is used to verify whether a second communication connection to the second node is established based on the second key.

Optionally, the communication unit 1002 is further configured to send an authentication response that is based on the second key to the second node, where the authentication response is used to verify an identity of a first node.

Optionally, that the authentication response is used to verify an identity of a first node includes: The authentication response is used by the second node to verify whether to establish the second communication connection to the first node based on the second key.

Optionally, the release request includes request cause information, and the request cause information indicates that a key used for communication authentication is updated.

Optionally, the second key is valid within first duration, and the first duration is defined by using a timer or a timestamp.

Optionally, the second key is valid within first duration starting from a first moment, and the first moment is a moment at which the first communication connection is released or a moment at which the connection establishment request is sent.

Optionally, the processing unit 1001 is further configured to perform, within a validity period of the second key, information transmission with a third node by using a backhaul link between the second node and the third node.

Optionally, the first key is a key derived (or negotiated) based on a first communication system, and/or the second key is a key derived (or negotiated) based on a second communication system, and the first communication system is different from the second communication system.

In some other embodiments, the apparatus 1000 may be configured to implement functions of the second apparatus in the foregoing method embodiments. The apparatus 1000 may be the second apparatus, or a chip, a circuit, or the like configured in the second apparatus. The processing unit 1001 may be configured to perform a processing-related operation of the second apparatus in the foregoing method embodiments, and the communication unit 1002 may be configured to execute a receiving and sending-related operation of the second apparatus in the foregoing method embodiments.

For example, the processing unit 1001 is configured to obtain a second key used for communication authentication with a first node, where the second key is different from a preconfigured first key. The communication unit 1002 is configured to send a release request for a first communication connection to the first node, where the first key is used for communication authentication on the first communication connection. The communication unit 1002 is further configured to receive a connection establishment request sent by the first node, where the connection establishment request is used to request to establish a connection based on the second key.

Optionally, that the connection establishment request is used to request to establish a connection based on the second key includes: The connection establishment request is used to request to perform an authentication and security context negotiation procedure based on the second key.

Optionally, the communication unit 1002 is further configured to send authentication information that is based on the second key to the first node, where the authentication information is used to verify an identity of the second node.

Optionally, that the authentication information is used to verify an identity of the second node includes that the authentication information is used by the first node to verify whether a second communication connection to the second node is established based on the second key.

Optionally, the first key is a key derived (or negotiated) based on a first communication system, and/or the second key is a key derived (or negotiated) based on a second communication system, and the first communication system is different from the second communication system.

Optionally, the communication unit 1002 is further configured to receive an authentication response that is based on the second key and that is from the first node, where the authentication response is used to verify an identity of the first node.

Optionally, that the authentication response is used to verify an identity of the first node includes: The authentication response is used by the second node to verify whether to establish the second communication connection to the first node based on the second key.

Optionally, the release request includes request cause information, and the request cause information indicates that a key used for communication authentication is updated.

Optionally, the second key is valid within first duration, and the first duration may be defined by using a timer or a timestamp.

Optionally, the second key is valid within the first duration starting from a first moment, and the first moment is a moment at which the first communication connection is released, or a moment at which the second node receives the connection establishment request.

Optionally, the processing unit 1001 is further configured to send, within a validity period of the second key, transmission information from the first node to a third node by using a backhaul link between the second node and the third node.

Optionally, after releasing the first communication connection to the first node, the processing unit 1001 is further configured to suspend the backhaul link.

Optionally, the processing unit 1001 is further configured to activate the backhaul link after determining that the second communication connection to the first node is successfully established, where communication authentication is performed on the second communication connection based on the second key.

In this embodiment of this application, division into the units is an example, and is merely a logical function division. In actual implementation, another division manner may be used. In addition, the functional units in this embodiment of this application may be integrated into one processor, or each of the units may exist alone physically, or two or more units are integrated into one unit. The integrated unit may be implemented in a form of hardware, or may be implemented in a form of a software function unit.

Figure 11:
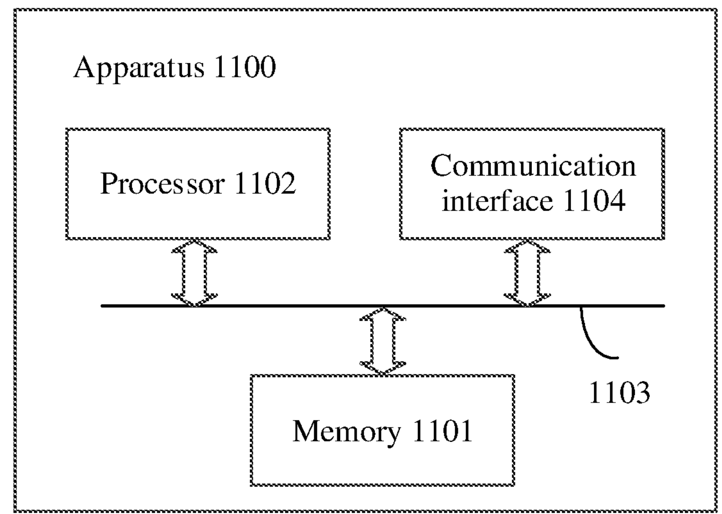
FIG. 11 is a schematic diagram of a structure of a second communication apparatus according to an embodiment of this application.

FIG. 11 is a schematic diagram of an apparatus 1100 according to an embodiment of this application. The apparatus 1100 may be a node or a component in a node, for example, a chip or an integrated circuit. The apparatus 1100 may include at least one processor 1102 and a communication interface 1104. Further, optionally, the apparatus may further include at least one memory 1101. Further, optionally, the apparatus may further include a bus 1103. The memory 1101, the processor 1102, and the communication interface 1104 are communicatively connected to each other through the bus 1103.

The memory 1101 is configured to provide storage space, and the storage space may store data such as an operating system and a computer program. The memory 1101 mentioned in embodiments of this application may be a volatile memory or a nonvolatile memory, or may include a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that the memory described in this specification aims to include but is not limited to these memories and any memory of another proper type. The processor 1102 is a module for performing an arithmetic operation and/or a logical operation, and may be specifically one or a combination of a plurality of processing modules such as a central processing unit (CPU), a graphics processing unit (GPU), a microprocessor (MPU), an application-specific integrated circuit (ASIC), a field programmable gate array (FPGA), a complex programmable logic device (CPLD), a coprocessor (assisting the central processing unit to complete corresponding processing and application), and a microcontroller unit (MCU).

It should be noted that when the processor is a general-purpose processor, an ASIC, an FPGA or another programmable logic device, a discrete gate or a transistor logic device, or a discrete hardware component, the memory (storage module) may be integrated into the processor.

The communication interface 1104 may be configured to provide information input or output for the at least one processor. Alternatively, the communication interface may be configured to receive data sent from an outside and/or send data to the outside, and may be a wired link interface including an ethernet cable and the like, or may be a wireless link (wireless fidelity (Wi-Fi), Bluetooth, universal wireless transmission, an in-vehicle short-range communication technology, or the like) interface. Optionally, the communication interface 1104 may further include a transmitter (such as a radio frequency transmitter or an antenna) coupled to the interface, a receiver, or the like.

In some embodiments, the apparatus 1100 may be the first apparatus in the foregoing method embodiment or a component in the first apparatus, for example, a chip or an integrated circuit. The processor 1102 in the apparatus 1100 is configured to: read a computer program stored in the memory 1101, and control the first apparatus to perform the following operations:

obtaining a second key used for communication authentication with a second node, where the second key is different from a preconfigured first key; receiving, from a second node, a release request for a first communication connection, where the first key is used for communication authentication on the first communication connection; and sending a connection establishment request to the second node, where the connection establishment request is used to request to establish a connection based on the second key.

Optionally, the processor 1102 in the first apparatus may be further configured to: read a program in the memory 1101 and perform the method procedure performed by the first node in S300 to S305 shown in FIG. 3; or perform the method procedure performed by the first node in S400 to S417 shown in FIG. 4A and FIG. 4B; or perform the method procedure performed by the first node in S500 to S519 shown in FIG. 5A and FIG. 5B; or perform the method procedure performed by the first node in S600 to S617 shown in FIG. 6A and FIG. 6B; or perform the method procedure performed by the first node in S700 to S724 shown in FIG. 7A and FIG. 7B; or perform the method procedure performed by the first node in S800 to S819 shown in FIG. 8A and FIG. 8B; or perform the method procedure performed by the first node in S900 to S921 shown in FIG. 9A to FIG. 9C.

For exemplary details, refer to the descriptions in the foregoing method embodiments. Details are not described again.

In some other embodiments, the apparatus 1100 may be the second apparatus in the foregoing method embodiment or a component in the second apparatus, for example, a chip or an integrated circuit. The processor 1102 in the apparatus 1100 is configured to: read a computer program stored in the memory 1101, and control the second apparatus to perform the following operations:

obtaining a second key used for communication authentication with a first node, where the second key is different from a preconfigured first key; sending a release request for a first communication connection to the first node, where the first key is used for communication authentication on the first communication connection; and receiving a connection establishment request sent by the first node, where the connection establishment request is used to request to establish a connection based on the second key.

Optionally, the processor 1102 in the second apparatus may be further configured to: read a program in the memory 1101 and perform the method procedure performed by the second node in S300 to S305 shown in FIG. 3; or perform the method procedure performed by the second node in S400 to S417 shown in FIG. 4A and FIG. 4B; or perform the method procedure performed by the second node in S500 to S519 shown in FIG. 5A and FIG. 5B; or perform the method procedure performed by the second node in S600 to S617 shown in FIG. 6A and FIG. 6B; or perform the method procedure performed by the second node in S700 to S724 shown in FIG. 7A and FIG. 7B; or perform the method procedure performed by the second node in S800 to S819 shown in FIG. 8A and FIG. 8B; or perform the method procedure performed by the second node in S900 to S921 shown in FIG. 9A to FIG. 9C.

For exemplary details, refer to the descriptions in the foregoing method embodiments. Details are not described again.

An embodiment of this application further provides a terminal. The terminal may be an intelligent terminal such as a smartphone, a notebook computer, or a tablet computer that has a short-range communication function, a mouse, a keyboard, a headset, a speaker, a vehicle-mounted playback device, or the like. The terminal includes a first apparatus and/or a second apparatus. The first apparatus and the second apparatus may be respectively the first node and the second node in the embodiment shown in FIG. 3. Types of the first apparatus and the second apparatus may be the same or different.

Figure 12:
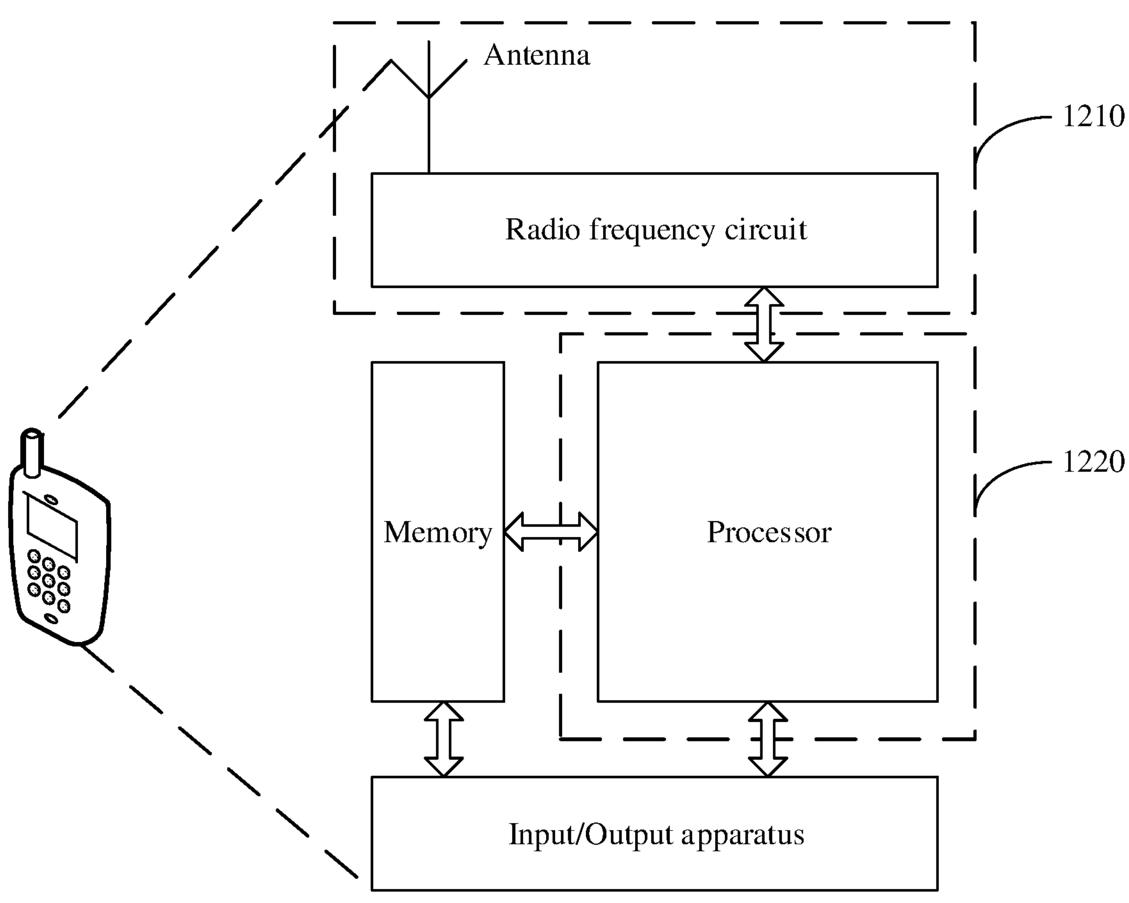
FIG. 12 is a schematic diagram of a structure of a terminal according to an embodiment of this application.

FIG. 12 is a schematic diagram of a simplified structure of a terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to process a communication protocol and communication data, control the terminal device, execute a software program, and process data of the software program. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and a radio frequency circuit that have a transceiver function may be considered as a transceiver unit of the terminal device, and a processor that has a processing function may be considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1210 is configured to perform a sending operation and a receiving operation on a first node side in the method embodiment shown in FIG. 3, and the processing unit 1220 is configured to perform another operation other than the sending operation and the receiving operation on the first node side in the method embodiment shown in FIG. 3.

For example, in an implementation, the transceiver unit 1210 is configured to perform sending and receiving steps on a terminal device side in the embodiment shown in FIG. 3, for example, S303 and S305, and/or is configured to support another process of the technology described in this specification. The processing unit 1220 is configured to perform an operation on the terminal device side in the embodiment shown in FIG. 3 other than the sending and receiving operations, for example, S300, and/or is configured to support another process of the technology described in this specification.

Alternatively, the transceiver unit 1210 is configured to perform a sending operation and a receiving operation on the terminal device side in the method embodiment shown in FIG. 4A and FIG. 4B, and the processing unit 1220 is configured to perform another operation other than the sending operation and the receiving operation on the terminal device side in the method embodiment shown in FIG. 4A and FIG. 4B.

For example, in an implementation, the transceiver unit 1210 is configured to perform sending and receiving steps on a terminal device side in the embodiment shown in FIG. 4A and FIG. 4B, for example, S406, and/or is configured to support another process of the technology described in this specification. The processing unit 1220 is configured to perform an operation on the terminal device side in the embodiment shown in FIG. 4A and FIG. 4B other than the sending and receiving operations, for example, S409, and/or is configured to support another process of the technology described in this specification.

Alternatively, the transceiver unit 1210 is configured to perform a sending operation and a receiving operation on the terminal device side in the method embodiment shown in FIG. 5A and FIG. 5B, and the processing unit 1220 is configured to perform another operation other than the sending operation and the receiving operation on the terminal device side in the method embodiment shown in FIG. 5A and FIG. 5B.

For example, in an implementation, the transceiver unit 1210 is configured to perform sending and receiving steps on a terminal device side in the embodiment shown in FIG. 5A and FIG. 5B, for example, S508, and/or is configured to support another process of the technology described in this specification. The processing unit 1220 is configured to perform an operation on the terminal device side in the embodiment shown in FIG. 5A and FIG. 5B other than the sending and receiving operations, for example, S511, and/or is configured to support another process of the technology described in this specification.

Alternatively, the transceiver unit 1210 is configured to perform a sending operation and a receiving operation on the terminal device side in the method embodiment shown in FIG. 6A and FIG. 6B, and the processing unit 1220 is configured to perform another operation other than the sending operation and the receiving operation on the terminal device side in the method embodiment shown in FIG. 6A and FIG. 6B.

For example, in an implementation, the transceiver unit 1210 is configured to perform sending and receiving steps on a terminal device side in the embodiment shown in FIG. 6A and FIG. 6B, for example, S606, and/or is configured to support another process of the technology described in this specification. The processing unit 1220 is configured to perform an operation on the terminal device side in the embodiment shown in FIG. 6A and FIG. 6B other than the sending and receiving operations, for example, S604, and/or is configured to support another process of the technology described in this specification.

Alternatively, the transceiver unit 1210 is configured to perform a sending operation and a receiving operation on the terminal device side in the method embodiment shown in FIG. 7A and FIG. 7B, and the processing unit 1220 is configured to perform another operation other than the sending operation and the receiving operation on the terminal device side in the method embodiment shown in FIG. 7A and FIG. 7B.

For example, in an implementation, the transceiver unit 1210 is configured to perform sending and receiving steps on a terminal device side in the embodiment shown in FIG. 7A and FIG. 7B, for example, S706, and/or is configured to support another process of the technology described in this specification. The processing unit 1220 is configured to perform an operation on the terminal device side in the embodiment shown in FIG. 7A and FIG. 7B other than the sending and receiving operations, for example, S704, and/or is configured to support another process of the technology described in this specification.

Alternatively, the transceiver unit 1210 is configured to perform a sending operation and a receiving operation on the terminal device side in the method embodiment shown in FIG. 8A and FIG. 8B, and the processing unit 1220 is configured to perform another operation other than the sending operation and the receiving operation on the terminal device side in the method embodiment shown in FIG. 8A and FIG. 8B.

For example, in an implementation, the transceiver unit 1210 is configured to perform sending and receiving steps on a terminal device side in the embodiment shown in FIG. 8A and FIG. 8B, for example, S806, and/or is configured to support another process of the technology described in this specification. The processing unit 1220 is configured to perform an operation on the terminal device side in the embodiment shown in FIG. 8A and FIG. 8B other than the sending and receiving operations, for example, S804, and/or is configured to support another process of the technology described in this specification.

Alternatively, the transceiver unit 1210 is configured to perform a sending operation and a receiving operation on the terminal device side in the method embodiment shown in FIG. 9A to FIG. 9C, and the processing unit 1220 is configured to perform another operation other than the sending operation and the receiving operation on the terminal device side in the method embodiment shown in FIG. 9A to FIG. 9C.

For example, in an implementation, the transceiver unit 1210 is configured to perform sending and receiving steps on a terminal device side in the embodiment shown in FIG. 9A to FIG. 9C, for example, S905, and/or is configured to support another process of the technology described in this specification. The processing unit 1220 is configured to perform an operation on the terminal device side in the embodiment shown in FIG. 9A to FIG. 9C other than the sending and receiving operations, for example, S915, and/or is configured to support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium, including instructions. When the instructions are run on a computer, the computer performs the method described in the foregoing embodiments.

An embodiment of this application further provides a chip system. The chip system includes at least one processor and interface circuit. Further, optionally, the chip system may further include a memory or an external memory. The processor is configured to execute instructions and/or data interaction through the interface circuit, to implement the method in the foregoing method embodiment. The chip system may include a chip, or may include a chip and another discrete component.

An embodiment of this application further provides a computer program product, including instructions. When the instructions are run on a computer, the computer performs the method described in the foregoing embodiments.

In embodiments of this application, the processor may be a general-purpose processor, a digital signal processor, an application-specific integrated circuit, a field programmable gate array or another programmable logic device, a discrete gate or transistor logic device, a discrete hardware component, or a coprocessor and may implement or execute the methods, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a nonvolatile memory, a hard disk drive (HDD) or a solid-state drive (SSD), or may be a volatile memory, for example, a random-access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

A person of ordinary skill in the art may be aware that, in combination with the examples described in embodiments disclosed herein, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be understood by a person skilled in the art that, for the purpose of convenient and brief description, for a detailed working process of the foregoing system, apparatus, and unit, refer to a corresponding process in the foregoing method embodiments. Details are not described herein again.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

It is understood that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:

establishing, by a first node, a first communication connection with a second node using a first key derived or negotiated based on a first communication system, wherein the first communication system is a wireless short-range communication system or a cellular communication system;

communicating, by the first node, with the second node via the first communication connection;

obtaining, by the first node, a second key derived or negotiated based on a second communication system;

receiving, by the first node from the second node, a release request for the first communication connection;

releasing, by the first node, the first communication connection;

sending, by the first node, a connection establishment request to the second node, wherein the connection establishment request is for requesting to establish a second communication connection based on the second key; and communicating, by the first node, with the second node via the second communication connection.

2. The method according to claim 1, further comprising:

performing an authentication and security context negotiation procedure for the second communication connection based on the second key.

3. The method according to claim 1, further comprising:

receiving, by the first node, authentication information based on the second key from the second node, wherein the authentication information is for verifying an identity of the second node.

4. The method according to claim 3, further comprising:

sending, by the first node, an authentication response based on the second key to the second node, wherein the authentication response is for verifying an identity of the first node.

5. The method according to claim 1, wherein the release request comprises request cause information; and wherein the request cause information indicates that a key for communication authentication has been updated.

6. The method according to claim 1, wherein the second key is valid within a first duration, and the first duration is defined by a timer or a timestamp.

7. The method according to claim 6, wherein the second key is valid within the first duration starting from a first moment, and the first moment is a moment at which the first communication connection is released or a moment at which the connection establishment request is sent.

8. The method according to claim 1, further comprising:

performing, by the first node within a validity period of the second key, information transmission with a third node by using a backhaul link between the second node and the third node.

9. The method according to claim 1, wherein the second communication system is a converged system in which wireless short-range communication and cellular communication have been converged.

10. A first node, comprising:

a transceiver configured to communicate with a second node;

a processor; and a memory having processor-executable instructions stored thereon;

wherein the processor is configured to execute the processor-executable instructions to facilitate the following being performed by the first node:

establishing a first communication connection with the second node using a first key derived or negotiated based on a first communication system, wherein the first communication system is a wireless short-range communication system or a cellular communication system;

communicating with the second node via the first communication connection;

obtaining a second key derived or negotiated based on a second communication system;

receiving, from the second node, a release request for the first communication connection;

releasing the first communication connection;

sending a connection establishment request to the second node, wherein the connection establishment request is for requesting to establish a second communication connection based on the second key; and communicating with the second node via the second communication connection.

11. The first node according to claim 10, wherein the processor is further configured to execute the processor-executable instructions to facilitate the following being performed by the first node:

performing an authentication and security context negotiation procedure for the second communication connection based on the second key.

12. The first node according to claim 10, wherein the processor is further configured to execute the processor-executable instructions to facilitate the following being performed by the first node:

receiving authentication information based on the second key from the second node, wherein the authentication information is for verifying an identity of the second node.

13. The first node according to claim 12, wherein the processor is further configured to execute the processor-executable instructions to facilitate the following being performed by the first node:

sending an authentication response based on the second key to the second node, wherein the authentication response is for verifying an identity of the first node.

14. The first node according to claim 10, wherein the release request comprises request cause information; and wherein the request cause information indicates that a key for communication authentication has been updated.

15. The first node according to claim 10, wherein the second key is valid within a first duration, and the first duration is defined by a timer or a timestamp.

16. The first node according to claim 15, wherein the second key is valid within the first duration starting from a first moment, and the first moment is a moment at which the first communication connection is released or a moment at which the connection establishment request is sent.

17. The first node according to claim 10, wherein the processor is further configured to execute the processor-executable instructions to facilitate the following being performed by the first node:

performing, by the first node within a validity period of the second key, information transmission with a third node by using a backhaul link between the second node and the third node.

18. A non-transitory computer-readable medium having processor-executable instructions stored thereon, wherein the processor-executable instructions, when executed, facilitate:

establishing, by a first node, a first communication connection with a second node using a first key derived or negotiated based on a first communication system, wherein the first communication system is a wireless short-range communication system or a cellular communication system;

communicating, by the first node, with the second node via the first communication connection;

obtaining, by the first node, a second key derived or negotiated based on a second communication system;

receiving, by the first node from the second node, a release request for the first communication connection;

releasing, by the first node, the first communication connection;

sending, by the first node, a connection establishment request to the second node, wherein the connection establishment request is for requesting to establish a second communication connection based on the second key; and communicating, by the first node, with the second node via the second communication connection.

19. The non-transitory computer-readable medium according to claim 18, wherein the processor-executable instructions, when executed, further facilitate:

performing an authentication and security context negotiation procedure for the second communication connection based on the second key.

20. The non-transitory computer-readable medium according to claim 18, wherein the processor-executable instructions, when executed, further facilitate:

receiving, by the first node, authentication information based on the second key from the second node, wherein the authentication information is for verifying an identity of the second node.

* * * * *